(12) United States Patent
Sangiamwong et al.

(10) Patent No.: US 8,422,942 B2
(45) Date of Patent: Apr. 16, 2013

(54) RADIO RELAY APPARATUS AND METHOD

(75) Inventors: Jaturong Sangiamwong, Yokosuka (JP); Takahiro Asai, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 682 days.

(21) Appl. No.: 12/551,835

(22) Filed: Sep. 1, 2009

(65) Prior Publication Data

US 2010/0062708 A1 Mar. 11, 2010

(30) Foreign Application Priority Data

Sep. 9, 2008 (JP) .................................. 2008-231469

(51) Int. Cl.
*H04B 7/15* (2006.01)

(52) U.S. Cl.
USPC ........ 455/11.1; 455/24; 455/562.1; 455/63.1; 455/13.1; 455/13.3; 455/7

(58) Field of Classification Search .............. 455/24, 455/562.1, 63.1, 11.1, 7, 13.1, 13.3
See application file for complete search history.

(56) References Cited

U.S. PATENT DOCUMENTS

| 7,826,337 | B2* | 11/2010 | Shi et al. ....................... 370/201 |
| 2007/0129008 | A1* | 6/2007 | Shi et al. ....................... 455/11.1 |

FOREIGN PATENT DOCUMENTS

WO  WO 2008/004916 A1  1/2008

OTHER PUBLICATIONS

Namyoon Lee, et al., "Linear Precoder and Decoder Design for Two-Way AF MIMO Relaying System", Proc. of VTC-2008, May 2008, pp. 1221-1225.
Japanese Office Action dated Aug. 8, 2012, with English translation.
Peter Larsson, Mikael Prytz, "MIMO On-Frequency Repeater with Self-Interference Cancellation and Mitigation," ADHOC' 08 Jul. 5, 2008, Apr. 28, 2008, pp. 1-23. http://wirelessadhoc.org/contribution2008/Peter_Larsson.
pdf#search='MIM0%200NFrequency%20with%20Self.

* cited by examiner

*Primary Examiner* — April G Gonzales
(74) *Attorney, Agent, or Firm* — Oblon, Spivak, McClelland, Maier & Neustadt, L.L.P.

(57) ABSTRACT

A disclosed radio relay apparatus receives signals from a transmitter via multiple receive antennas and transmits relay signals derived from the received signals to a receiver via multiple transmit antennas. The apparatus includes a channel estimation unit configured to estimate a forward channel matrix $H_1$ representing radio channel characteristics between the transmitter and the radio relay apparatus and a loop channel matrix G representing interference occurring in the relay signals due to concurrently transmitting and receiving signals at the radio relay apparatus, a weight optimization unit configured to derive a canceling matrix C through iterative operations using the forward channel matrix $H_1$, the loop channel matrix G and a backward channel matrix $H_2$ representing radio channel characteristics between the radio relay apparatus and the receiver, and a feedback compensation unit configured to subtract a signal weighted in accordance with the canceling matrix C in a feedback path from a relay signal in a main signal path to adjust the relay signal.

14 Claims, 13 Drawing Sheets

RADIO RELAY APPARATUS AND METHOD

BACKGROUND OF THE INVENTION

1. Field of the Invention

The present invention generally relates to mobile communication techniques with radio relay and more particularly relates to a radio relay apparatus and a radio relay method in radio relay systems.

2. Description of the Related Art

In the mobile communication techniques, it is important to achieve the widest coverage areas possible. To this end, it is discussed that radio relay techniques are to be utilized in next generation radio communication systems. In the radio relay techniques, for example, in downlinks, signals transmitted from a base station are received at a relay station, and the received signals are amplified at the relay station and retransmitted to a mobile station. In this manner, the mobile station can receive the signals at increased power, resulting in wider coverage.

Moreover, it is also important to improve frequency utilization efficiency. To this end, it is discussed that a MIMO (Multiple-Input Multiple-Output) technique is to be applied to the above radio relay techniques. A MIMO applied radio relay system is disclosed in "Linear precoder and decoder for two-way AF MIMO relaying system" by N. Lee, H. Park and J. Chun (Proc. of VTC-2008 Spring, May 2008). In this radio relay system, weight matrices for reducing inter-antenna interference and inter-user interference are optimized to minimize a bit error rate.

In downlinks, a relay station receives signals from a base station and transmits the signals to a mobile station. In uplinks, on the other hand, the relay station receives signals from the mobile station and transmits the signals to the base station. Here, if the signal transmission and the signal reception are performed simultaneously regardless of the uplinks and downlinks, the signals transmitted from the relay station would be received at that relay station, which may cause circuit oscillation. This phenomenon is called loop interference or self-interference, and if the loop interference is strong, the relay station would fail to relay the signals properly. In WO 2008/004916, this problem is addressed by estimating such a loop channel, calculating a feedback type of weight matrix (canceling matrix) for removing the loop interference, and reducing the inter-antenna interference and the inter-user interference while removing the loop interference. WO 2008/004916 attempts to reduce the inter-antenna interference and the inter-user interference by determining a feedforward type of weight matrix (precoding/weighting matrix) in accordance with a ZF (Zero-Forcing) method, for example.

SUMMARY OF THE INVENTION

According to Lee's disclosure, the weight matrices are optimized to reduce the inter-antenna interference and the inter-user interference, but the loop interference is not considered. As a result, if the loop interference is present, signals with a sufficient quality could not be received.

According to the disclosure in WO 2008/004916, weight matrices are determined to reduce not only the loop interference but also the inter-antenna interference and the inter-user interference. However, the weight matrices for reducing the loop interference, the inter-antenna interference and the inter-user interference are independently designed. As a result, even if the independently designed weight matrices remove the respective causes of interference, there is a risk that error rate and/or capacity performance may be rather degraded from the viewpoint of the overall system.

Thus, it is an object of the present invention to improve an overall system's error rate and/or capacity in a radio relay system that includes a transmitter, a relay apparatus and a receiver and transfers signals in accordance with the MIMO scheme.

One aspect of the present invention relates to a radio relay apparatus for receiving signals from a transmitter via multiple receive antennas and transmitting relay signals derived from the received signals to a receiver via multiple transmit antennas, including: a channel estimation unit configured to estimate a forward channel matrix $H_1$ and a loop channel matrix G, the forward channel matrix $H_1$ representing radio channel characteristics between the transmitter and the radio relay apparatus, the loop channel matrix G representing interference occurring in the relay signals due to concurrently transmitting and receiving signals at the radio relay apparatus; a weight optimization unit configured to derive a canceling matrix C through iterative operations using the forward channel matrix $H_1$, the loop channel matrix G and a backward channel matrix $H_2$ representing radio channel characteristics between the radio relay apparatus and the receiver; and a feedback compensation unit configured to subtract a signal weighted in accordance with the canceling matrix C in a feedback path from a relay signal in a main signal path to adjust the relay signal.

According to the present invention, an overall error rate can be improved in a radio relay system for transferring signals in accordance with a MIMO scheme.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENTS

Figure 1:
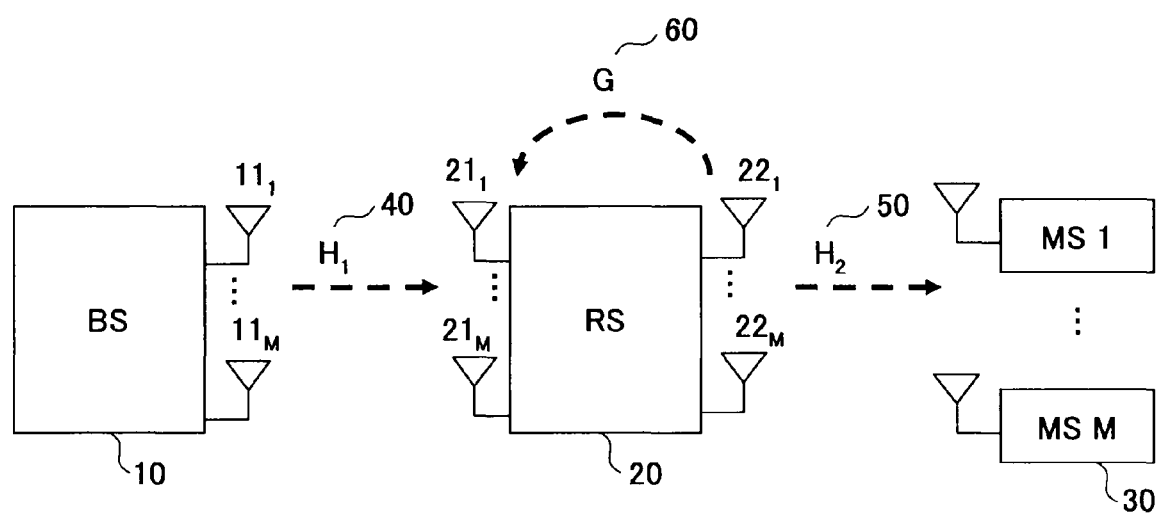
FIG. 1 illustrates an exemplary arrangement of a radio relay system according to one embodiment of the present invention.

According to a first aspect of the present invention, a radio relay apparatus having multiple transmit and receive antennas includes a channel estimation unit operable to estimate a channel $H_1$ between a radio base station apparatus and the radio relay apparatus and a loop channel G, a canceling unit operable to subtract a signal generated in accordance with a feedback type weight matrix (canceling matrix) C from a signal received via the receive antenna, and an optimal weight matrix calculation unit operable to use the estimated channel $H_1$ and loop channel G and a channel $H_2$ between the radio relay apparatus and a mobile terminal to optimize the feedback type canceling matrix C for the radio relay apparatus.

The weight matrix can be generated to reduce loop interference, inter-antenna interference and inter-user interference in consideration of interaction among them, which can improve an error rate and/or capacity performance in a radio relay system.

According to a second aspect of the present invention, the above radio relay apparatus may further include a weighting unit operable to multiply a feedforward type weight matrix (weighting matrix) W with signals processed in the canceling unit. The optimal weight matrix calculation unit may optimize the feedback type canceling matrix C and the feedforward type weighting matrix W using the estimated channel $H_1$ and loop channel G and the channel $H_2$ transmitted to the radio relay apparatus.

The weighting matrix W and the canceling matrix C are jointly updated, which can improve the error rate and/or capacity performance in the radio relay system.

According to a third aspect of the present invention, the above radio relay apparatus may further include a weight matrix transmitting unit operable to transmit a precoding weight matrix (precoding matrix) F calculated in the optimal weight matrix calculation unit to the radio base station apparatus. The optimal weight matrix calculation unit may use the estimated channel $H_1$ and loop channel G and the channel $H_2$ transmitted to the radio relay apparatus to optimize the feedback type canceling matrix C in the radio relay apparatus and the feedforward type precoding matrix F in the radio base station apparatus.

The precoding matrix F and the canceling matrix C can be jointly updated, which can further improve the error rate and/or capacity performance in the radio relay system.

According to a fourth aspect of the present invention, the above radio relay apparatus may further include a weighting unit operable to multiply the feedforward type weighting matrix W with signals processed in the canceling unit and a weight matrix transmitting unit operable to transmit the precoding matrix F calculated in the optimal weight matrix calculation unit to the radio base station apparatus. The optimal weight matrix calculation unit may use the estimated channel $H_1$ and loop channel G and the channel $H_2$ transmitted to the radio relay apparatus to optimize the feedback type canceling matrix C, the feedforward type weighting matrix W and the feedforward type precoding matrix F.

All the canceling matrix C, the weighting matrix W and the precoding matrix F can be updated in consideration of interactions with them, which can further improve the error rate and/or capacity performance in the radio relay system.

According to a fifth aspect of the present invention, the above radio relay apparatus may further include a transmit power control unit operable to control the total transmit power in the radio relay apparatus. The transmit power control unit enables relay signals adjusted in accordance with the above optimized matrices to be transmitted at appropriate total transmit power, which can further improve the error rate and/or capacity performance in the radio relay system.

According to a sixth aspect of the present invention, a radio communication method for a radio relay apparatus having multiple transmit and receive antennas is used. The method includes estimating a channel $H_1$ between a radio base station apparatus and the radio relay apparatus and a loop channel G using signals received via the receive antennas, optimizing a feedback type canceling matrix C through iterative operations using the estimated channel $H_1$ and loop channel G and a transmitted channel $H_2$ between the radio relay apparatus and a mobile station, and subtracting signals generated in accordance with the calculated feedback type canceling matrix C from the signals received via the receive antennas.

According to a seventh aspect of the present invention, the optimizing step in the above method may include optimizing the feedback type canceling matrix C and a feedforward type weighting matrix W through the iterative operations using the estimated channel $H_1$ and loop channel G and the channel $H_2$ transmitted to the radio relay apparatus. The calculated feedforward type weighting matrix W is multiplied with signals processed from the canceling unit.

According to an eighth aspect of the present invention, the optimizing step in the above method may include optimizing the feedback type canceling matrix C and the feedforward type precoding matrix F through the iterative operations using the estimated channel $H_1$ and loop channel G and the channel $H_2$ transmitted to the radio relay apparatus. The calculated precoding matrix F is transmitted to the radio base station apparatus.

According to a ninth aspect of the present invention, the optimizing step in the above method may include optimizing the feedback type canceling matrix C, the feedforward type weighting matrix W and the feedforward type precoding matrix F through the iterative operations using the estimated channel $H_1$ and loop channel G and the channel $H_2$ transmitted to the radio relay apparatus. The calculated feedforward type weighting matrix W is multiplied with signals processed from the canceling unit. The calculated precoding matrix F is transmitted to the radio base station apparatus.

According to a tenth aspect of the present invention, the above method may further include controlling the total transmit power in the radio relay apparatus.

Embodiments of the present invention are described with reference to the accompanying drawings. In the drawings, the same or similar portions are referred to as the same or similar reference numerals. The drawings are schematically illustrated and are not intended to illustrate exactly scaled apparatus arrangements.

Embodiments of the present invention are described through sections below.

1. First embodiment (F∝I, W=I)
1.1 Arrangement of radio communication system
1.2 Arrangement of radio communication apparatus
1.3 Radio relay apparatus
1.4 Weight matrix optimization
1.5 Control of total transmit power
1.6 Operation and effect
2. Second embodiment (F∝I, W≠I)
2.1 Radio relay apparatus
2.2 Weight matrix optimization
2.3 Control of total transmit power
2.4 Operation and effect
3. Third embodiment (general F, W=I)
3.1 Radio relay apparatus
3.2 Weight matrix optimization
3.3 Control of total transmit power
3.4 Operation and effect
4. Fourth embodiment (general F, W≠I)
4.1 Radio relay apparatus
4.2 Weight matrix optimization
4.3 Control of total transmit power
4.4 Operation and effect
5. Fifth embodiment First Embodiment The first embodiment of the present invention (F∝I, W=I) is described below.

(1.1 Arrangement of Radio Communication System)

Throughout the specification, bold-typed characters may be used to represent vectors and matrices. However, non-bold-typed characters may also be used to represent vectors and matrices.

FIG. 1 illustrates an exemplary arrangement of a radio relay system. In subsequent drawings, portions relating to the present invention are mainly illustrated. In this embodiment, the present invention is applied to downlinks, but the present invention is not limited to it. The present invention can be similarly applied to uplinks, which is described in detail in conjunction with FIG. 11. As illustrated in FIG. 1, the radio relay system includes a radio communication apparatus BS10 serving as a radio base station, a radio communication apparatus RS20 serving as a radio relay station, and multiple radio communication apparatuses MS30 serving as mobile terminals that cannot directly communicate with the radio communication apparatus BS10. In the illustration for downlinks, the radio communication apparatus BS10, the radio communication apparatus RS20 and the radio communication apparatuses MS30 may be referred to as "transmitter", "relay apparatus" and "receivers", respectively. On the other hand, in the illustration for uplinks, the radio communication apparatuses MS30, the radio communication apparatus RS20 and the radio communication apparatus BS10 may be referred to as "transmitters", "relay apparatus" and "receiver", respectively. It is assumed that the radio communication apparatuses BS10, RS20 each has multiple antennas while the communication apparatuses MS30 each has a single antenna. However, this assumption is made only for simplification. The present invention can be applied to the communication apparatus MS30 having multiple antennas.

It is assumed that a radio link 40 between the radio communication apparatuses BS10 and RS20 has channel characteristics $H_1$. In general, the channel characteristics $H_1$ may be represented as a $M_{r,RS} \times M_{t,BS}$ sized matrix and referred to as a "forward channel matrix" for convenient illustration. The parameter $M_{r,RS}$ represents the number of receive antennas in the radio communication apparatus RS20. The parameter $M_{t,BS}$ represents the number of transmit antennas in the radio communication apparatus BS10. Thus, the forward channel matrix $H_1$ may be represented as $$H_1 = \begin{bmatrix} h_{1,1} & \cdots & h_{1,M_{t,BS}} \\ \vdots & \ddots & \vdots \\ h_{M_{r,RS},1} & \cdots & h_{M_{r,RS},M_{t,BS}} \end{bmatrix}. \tag{1}$$

In the formula (1), a component $h_{1,1}$ represents a channel characteristic for a channel between a transmit antenna $11_1$ in the radio communication apparatus BS10 and a receive antenna $21_1$ in the radio communication apparatus RS20. Similarly, a component $h_{M_{t,BS},M_{r,RS}}$ represents a channel characteristic for a channel between a transmit antenna $11_{M_{t,BS}}$ in the radio communication apparatus BS10 and a receive antenna $21_{M_{r,RS}}$ in the radio communication apparatus RS20. For simplicity, it is assumed that $M_{r,RS}=M_{t,BS}=M$ as illustrated in FIG. 1. However, the present invention can be applied even if the number of transmit antennas is different from the number of receive antennas.

Similarly, it is assumed that a radio link 50 between the radio communication apparatus RS20 and the radio communication apparatuses MS30 has channel characteristics $H_2$. In general, the channel characteristics $H_2$ may be represented as a $M_{MS} \times M_{t,RS}$ sized matrix and referred to as a "backward channel matrix" for convenient illustration. The parameter $M_{MS}$ represents the number of the communication apparatuses MS30 serving as mobile terminals. The parameter $M_{t,RS}$ represents the number of transmit antennas in the radio communication apparatus RS20. For simplicity, it is assumed that $M_{r,RS}=M_{t,BS}=M$ as illustrated in FIG. 1. However, the present invention can be applied even if the number of transmit antennas is different from the number of receive antennas (number of mobile terminals).

Also, it is assumed that a radio link 60 from the transmit antennas 22 to the receive antennas 21 in the radio communication apparatus RS20 has channel characteristics G. The radio link 60 may cause interference for signals relayed by the radio communication apparatus RS20 in that the signals transmitted from the radio communication apparatus RS20 may be received at the radio communication apparatus RS20 again. For this reason, this interference may be referred to as "loop interference". The channel characteristics G may be represented as a $M_{t,RS} \times M_{r,RS}$ sized matrix and referred to as a "loop channel matrix" for convenient illustration. The parameter $M_{t,RS}$ represents the number of transmit antennas in the radio communication apparatus RS20. The parameter $M_{r,RS}$ represents the number of receive antennas in the radio communication apparatus RS20. For simplicity, it is assumed that $M_{t,RS}=M_{r,RS}=M$ as illustrated in FIG. 1. However, the present invention can be applied even if the number of transmit antennas is different from the number of receive antennas.

(1.2 Arrangement of Radio Communication Apparatus)

Figure 2:
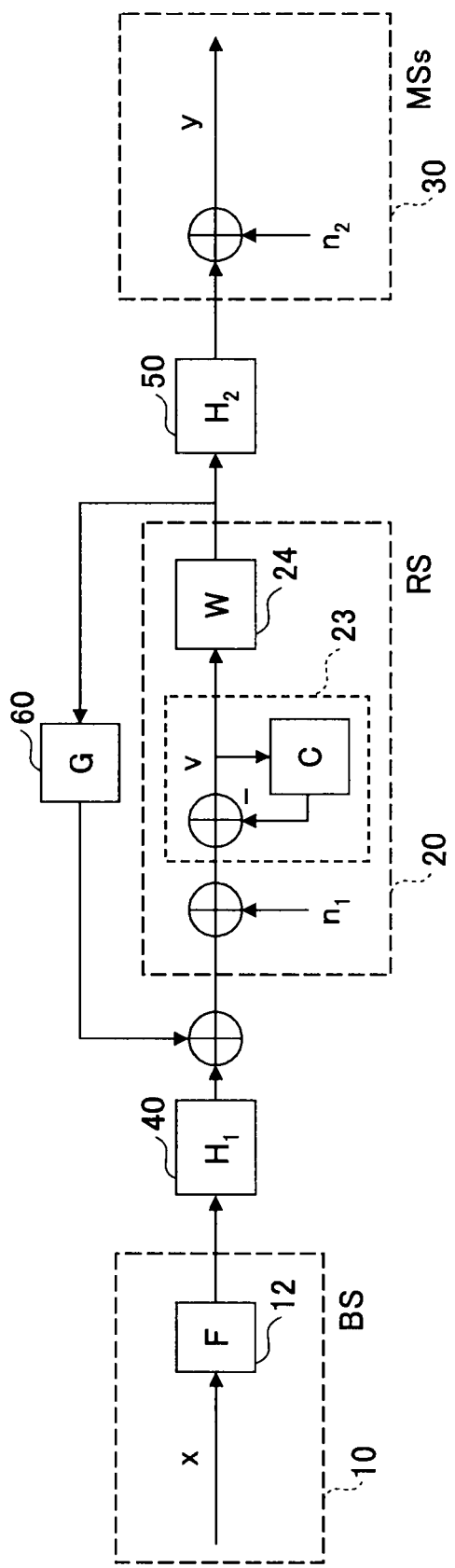
FIG. 2 is a block diagram schematically illustrating operations in a radio relay system according to one embodiment of the present invention.

FIG. 2 illustrates an exemplary arrangement of a radio communication apparatus according to one embodiment of the present invention. The radio communication apparatus BS10 multiplies a M-dimensional signal vector x transmitted as a data stream with a precoding matrix F at a precoding unit 12 and then transmits the processed signal. In this embodiment, the vector x consists of M components being symbols transmitted to $MS_1$ through $MS_M$. The signal transmitted from the radio communication apparatus BS10 is received at the radio communication apparatus RS20 via the radio link 40 having the channel characteristics $H_1$. At this time, an interference signal (loop interference signal) may also be received via the radio link 60 having the channel characteristics G.

The radio communication apparatus RS20 receives signals via multiple receive antennas. Thermal noise $n_1$ may be added to the signals received via the receive antennas. The thermal noise $n_1$ may be represented as a vector having M components, which may represent thermal noise components added at the receive antennas $21_1$ through $21_M$. After adjustment by a canceling unit 23, the received signals including the thermal noise $n_1$ are weighted (multiplied) with a feedforward type weighting matrix W and transmitted (relayed) to the radio communication apparatuses MS30. The canceling unit 23 subtracts the signals generated in accordance with a feedback type canceling matrix C from a main signal. In this case, hence, the term "feedback" is associated with weighting operations in a path from the output side to the input side in a main signal path for transmitting relayed signals. The term "feedforward" is associated with weighting (multiplying) operations in the main signal path. The present invention is not intended to exclude the weighting matrix W being adaptively controlled in accordance with some feedback signals or indications. This also holds for the precoding matrix F. In other words, the present invention is not intended to exclude the precoding matrix F being adaptively controlled in accordance with some feedback signals or indications.

As stated above, the canceling matrix C and the weighting matrix W have dimensions M×M. Signals outgoing from the canceling unit 23 may be referred to as a vector v having M components. Signals transmitted from the radio communication apparatus RS20 are received at the communication apparatuses $MS30_1$ through $MS30_M$ via the radio link 50 having the channel characteristics $H_2$, and thermal noise is added to the signal. In this embodiment, a vector $n_2$ representing the thermal noise has M components representing thermal noise components added at the communication apparatuses $MS30_1$ through $MS30_M$. Also, a received signal vector also has M components representing received signal components added to the thermal noise at the communication apparatuses $MS30_1$ through $MS30_M$.

Mathematical formulae for main signals are presented below. The signal v subjected to removal of loop interference at the canceling unit 23 may be represented as $$v = H_1 Fx + GWv + n_1 - Cv$$

$$v = (I + C - GW)^{-1}(H_1 Fx + n_1) \quad (2),$$

where I represents an identity matrix with the size M×M.

A signal y received at the radio communication apparatus MS30 serving as a final receiver in downlinks may be represented as $$y = H_2 Wv + n_2 \quad (3).$$

Substituting the signal v as represented in formula (2) into formula (3), the signal y can be represented as $$y = H_2 W(I + C - GW)^{-1} H_1 Fx + H_2 W(I + C - GW)^{-1} n_1 + n_2 \quad (4)$$

(1.3 Radio Relay Apparatus)

Figure 3:
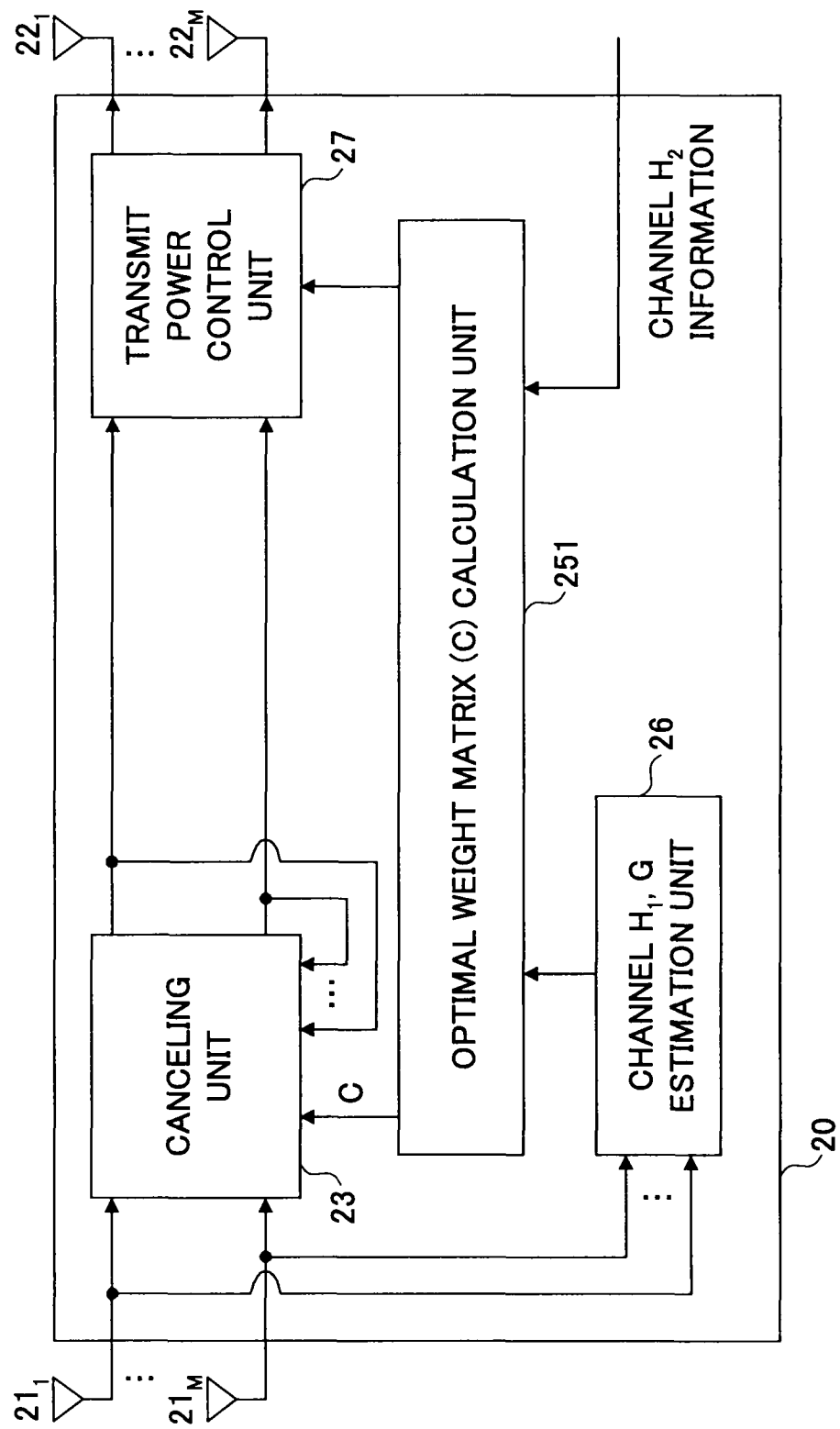
FIG. 3 illustrates an exemplary arrangement of a radio communication apparatus according to a first embodiment of the present invention.

An exemplary functional arrangement of the radio communication apparatus RS20 having a radio relay function in a radio relay system according to one embodiment of the present invention is described with reference to FIG. 3. In FIG. 3, the radio communication apparatus RS20 includes receive antennas 21, transmit antennas 22, a canceling unit 23 for removing loop interference and reducing inter-antenna inference and inter-user interference, an optimal weight matrix calculation unit 251, a channel estimation unit 26 and a transmit power control unit 27.

The receive antennas 21 receive signals transmitted from the radio communication apparatus BS10 serving as a radio base station apparatus.

The canceling unit 23 uses the feedback type canceling matrix C to generate signals for reducing the loop interference and the inter-antenna and inter-user interference. Then, the canceling unit 23 subtracts the generated signals from the signals received at the receive antennas 21.

The optimal weight matrix calculation unit 251 uses the channel matrices $H_1$, $H_2$ and G to perform iterative calculations to optimize at least the canceling matrix C. In the first embodiment, the optimal weight matrix calculation unit 251 mainly optimizes the canceling matrix C. In other embodiments as described below, the optimal weight matrix calculation unit 251 optimizes not only the canceling matrix C but also the precoding matrix F and/or the weighting matrix W. In systems to which FDD (Frequency Division Duplexing) is applied, different frequencies are used in uplinks and downlinks. Thus, it is preferred that the channel matrices $H_1$, G be estimated at the channel estimation unit 26 while the backward channel matrix $H_2$ be transmitted from mobile stations. On the other hand, in systems to which TDD (Time Division Duplexing) is applied, the same frequency is used for uplinks and downlinks. Thus, the radio relay apparatus RS20 may estimate not only the forward channel matrix $H_1$ but also the backward channel matrix $H_2$.

The channel estimation unit 26 uses received signals to estimate channel characteristics. This estimation may be carried out through investigation of pilot channels in the received signals, for example.

The transmit power control unit 27 controls transmit power in the radio communication apparatus RS20. As one example, the transmit power may be controlled to make the total transmit power less than or equal to a predefined value. As another example, the transmit power may be controlled for individual transmit antennas.

The transmit antennas 22 transmit (relay) signals to the radio communication apparatuses MS30.

(1.4 Weight Matrix Optimization)

Next, an exemplary optimization scheme for the feedback type canceling matrix C at the radio communication apparatus RS20 having a radio relay function according to the first embodiment of the present invention is described below. In the first embodiment, the radio communication apparatus BS10 having a base station function does not use the precoding matrix F to perform feedforward type precoding. In other words, the precoding matrix F is set to be $\sqrt{(P_0/M)} \cdot I$ in the radio communication apparatus BS10. The parameter $P_0$ represents the total transmit power in the radio communication apparatus BS10, and I is an identity matrix. In this case, the radio communication apparatus BS10 as illustrated in FIG. 2 would transmit components of a transmitted signal vector x from the respective transmit antennas.

In addition, in the first embodiment, no feedforward type weighting operation is carried out in the radio communication apparatus RS20. In other words, the weighting matrix W could be set to I in the radio communication apparatus RS20. In this embodiment, the radio communication apparatus RS20 transmits components of the signal v processed at the canceling unit 23 from the respective transmit antennas. First of all, general formulae are first derived in a subsequent description, and specific forms F, W are then substituted.

In the first embodiment, a calculation scheme for the feedback type canceling matrix C in the radio communication apparatus RS20 is designed to minimize a receive error rate and may be represented as $$\min_C tr\{E[(y-x) \cdot (y-x)^H]\} \quad (5)$$

$$\text{s.t. } tr\{E[(W(I+C-GW)^{-1}(H_1Fx+n_1)) \cdot (W(I+C-GW)^{-1}(H_1Fx+n_1))^H]\} = P_r,$$

where the notation "tr" or trace represents an operator for summing diagonal components of a matrix, the parameter $P_r$ represents the total transmit power in the radio communication apparatus RS20, the notation "E" represents an operator to take an average or an expected value, and the suffix "H" represents an operator to take a complex conjugate transpose. The first line in formula (5) means to calculate the canceling matrix C such that a mean square error between the transmitted signal x and the received signal y can be minimized. The second line in formula (5) represents $tr\{E[(Wv)(Wv)^H]\}=P_r$, which may represent a constraint that the total transmit power be equal to $P_r$ in the radio communication apparatus RS20.

In order to derive an optimal solution for the canceling matrix C, formula (5) may be modified based on a Lagrangian Dual Problem as indicated in formula (6), $$L(C, \mu) = \quad (6)$$
$$tr\{E[(y-x)\cdot(y-x)^H]\} + \mu(tr\{E[(W(I+C-GW)^{-1}(H_1Fx+n_1)) \cdot (W(I+C-GW)^{-1}(H_1Fx+n_1))^H]\} - P_r),$$

where $\mu$ is a Lagrange multiplier. The optimal solution for the Lagrangian Dual Problem as indicated in formula (6) can be calculated by using a Karush-Kuhn-Tucker (KKT) condition as indicated in formula (7), $$\nabla_C L(C,\mu)=0$$

$$\mu(tr\{E[(W(I+C-GW)^{-1}(H_1Fx+n_1))\cdot(W(I+C-GW)^{-1}(H_1Fx+n_1))^H]\}-P_r)=0 \quad (7),$$

where the notation $\nabla$ represents a differential operator, and matrix differential formulae as indicated in formulae (8) through (12) are applied to calculate the first line in formula (7), $$\frac{\partial tr\{X\}}{\partial X} = I, \quad (8)$$

$$\frac{\partial tr\{XX\}^H}{\partial X} = H*, \quad (9)$$

$$\frac{\partial tr\{X^{-1}\}}{\partial X} = -X^{-2T}, \quad (10)$$

$$\frac{\partial tr\{MN^{-1}P\}}{\partial N} = -(N^{-1}PMN^{-1})^T, \quad (11)$$

$$Q = MNP, \frac{\partial tr\{X\}}{\partial N} = M^T \frac{\partial tr\{X\}}{\partial Q} P^T, \quad (12)$$

where the suffixes "H", "*" and "T" represent a complex conjugate transpose, a complex conjugate and a transpose, respectively. An optimal solution for formula (7) can be represented as formula (13) by applying the matrix differential formulae (8) through (12), $$C = \quad (13)$$
$$\{[H_1FF^HH_1^H + \sigma_1^2 I][H_2^HF^HH_1^H]^{-1}[H_2^HH_2+\mu I]+G\}W - I$$

$$\mu = \frac{tr\{U\}}{P_r}$$

$$U = H_2^H[I - H_2W(I+C-GW)^{-1}H_1F][W(I+C-GW)^{-1}H_1F]^H - \sigma_1^2 H_2^H H_2[W(I+C-GW)^{-1}][W(I+C-GW)^{-1}]^H,$$

where $\sigma_1^2$ represents thermal noise power in the radio communication apparatus RS20.

Referring to formula (13), the optimal solution for the canceling matrix C in the radio communication apparatus RS20 is not represented in a closed form. Thus, the optimal solution may be derived through iterative approximations by using an iterative numerical calculation algorithm.

Figure 4:
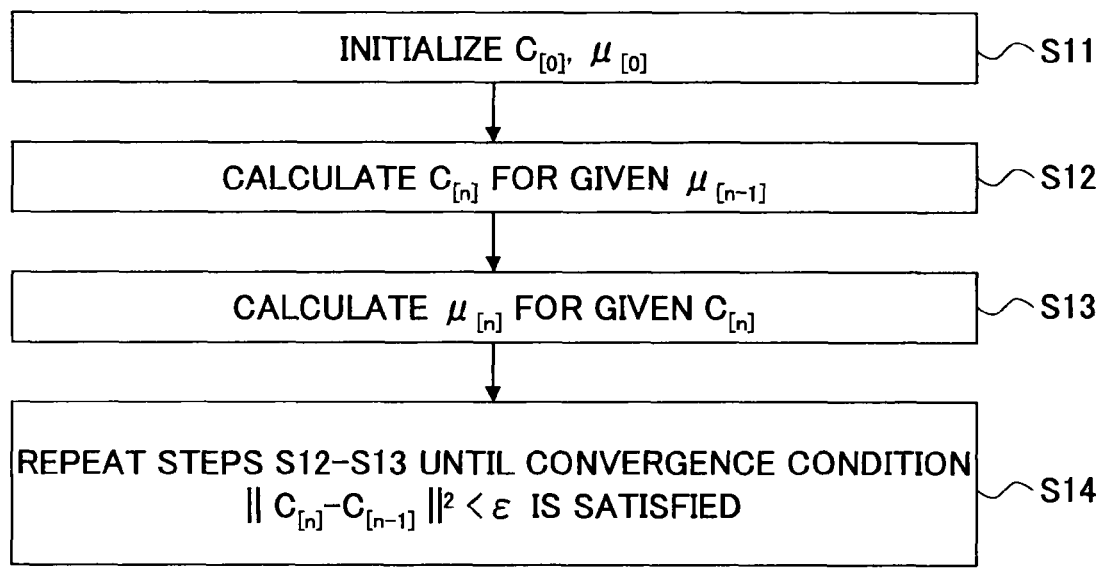
FIG. 4 is a flow diagram illustrating an exemplary operation to calculate an optimal weight matrix in the radio communication apparatus according to the first embodiment.

FIG. 4 illustrates an exemplary operation for such a numerical calculation algorithm. In the first embodiment, the precoding matrix F is $\sqrt{(P_o/M)} \cdot I$, and the weighting matrix W is I. These are substituted into the above formula.

At step S11, the canceling matrix C and the Lagrange multiplier $\mu$ are initialized to initial values. The subscript [n] represents the number of iterations.

At step S12, the first line in formula (13) is calculated by using the previous Lagrange multiplier $\mu_{[n-1]}$ to update the canceling matrix C.

At step S13, the second and third lines in formula (13) are calculated by using the updated canceling matrix $C_{[n]}$ to update the Lagrange multiplier $\mu$.

At step S14, it is determined whether the canceling matrix $C_{[n]}$ has converged. Specifically, a norm of differences between components of the presently derived canceling matrix $C_{[n]}$ and components of the previously derived canceling matrix $C_{[n-1]}$ are calculated. If this norm is smaller than $\epsilon$, it is determined that the canceling matrix $C_{[n]}$ has converged, and then the algorithm ends. Otherwise, steps S2, S3 are repeated. In order to avoid going into an infinite loop, the algorithm may be forced to terminate after a predefined number of iterations. The determination on convergence is not limited to the above determination scheme, and any other appropriate determination criteria may be used.

(1.5 Constraint on Total Transmit Power)

The canceling unit 23 uses the weight matrix (canceling matrix) C calculated in accordance with the algorithm as illustrated in FIG. 4 to adjust relayed signals. The adjusted signal v is multiplied with $$\sqrt{P_r/P_{r,pro}} \quad (14).$$

Through the multiplication with the value in formula (14), the total transmit power of the radio communication apparatus RS20 can be limited to $P_r$. Note that $P_{r,pro}$ represent power before transmit power control is conducted and may be represented as $$P_{r,pro} = tr\{(W(I+C-GW)^{-1}H_1F)(W(I+C-GW)^{-1}H_1F)^H\} + \quad (15)$$
$$\sigma_1^2 \cdot tr\{(W(I+C-GW)^{-1})(W(I+C-GW)^{-1})^H\}.$$

(1.6 Operation and Effect)

In this manner, it is assumed that the channel matrices $H_1$, $H_2$, G are considered for weight matrix optimization in the radio communication apparatus RS20. Thus, it is possible to improve a bit error rate performance for the overall system by optimizing the canceling matrix C through iterative operations. Also, signals can be transmitted at the maximum transmit power allowed for the radio communication apparatus RS20 by controlling the total transmit power in the radio communication apparatus RS20, and thus the bit error rate characteristic can be further improved.

Second Embodiment

The second embodiment of the present invention ($F \propto I$, $W \neq I$) is described below. Portions like the above-mentioned first embodiment are not repeatedly described. In the first embodiment, the feedback type canceling matrix C is optimized at the radio communication apparatus RS20 having a radio relay function. On the other hand, in the second embodiment, the weighting matrix W and the canceling matrix C are jointly optimized. Also in the second embodiment, however, precoding is performed at the radio communication apparatus BS10 having a radio base station function similar to the first embodiment. In other words, the precoding matrix F being equal to $\sqrt{P_o/M} \cdot I$ is used.

(2.1 Radio Relay Apparatus)

Figure 5:
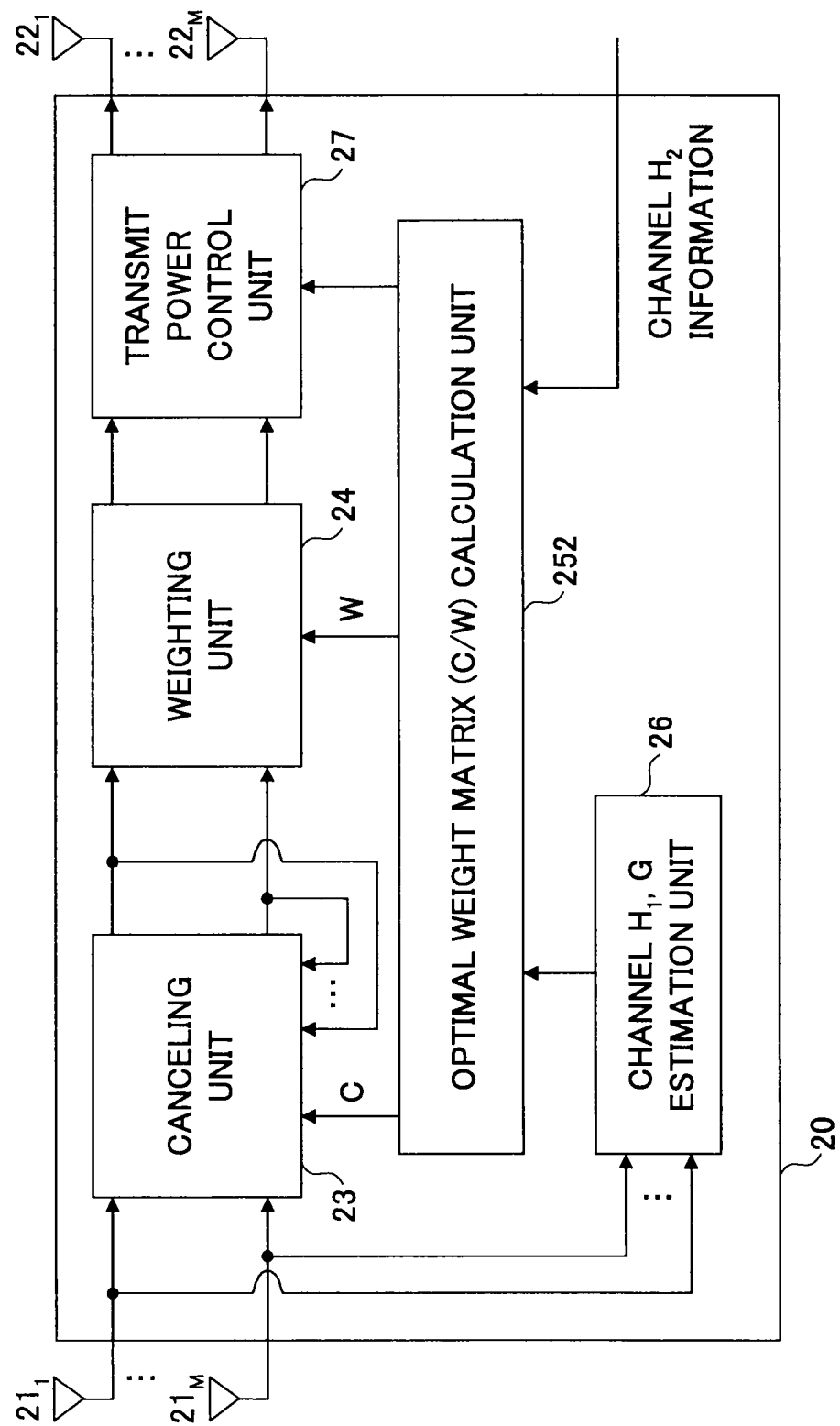
FIG. 5 illustrates an exemplary arrangement of a radio communication apparatus according to a second embodiment of the present invention.

FIG. 5 illustrates an exemplary functional arrangement of the radio communication apparatus RS20 having a radio relay function according to this embodiment. Similar to the first embodiment, the radio communication apparatus RS20 includes receive antennas 21, transmit antennas 22, a canceling unit 23 for removing loop interference, an optimal weight matrix calculation unit 252, a channel estimation unit 26 and a transmit power control unit 27. The radio communication apparatus RS20 according to the second embodiment differs from the first embodiment in that it further includes a weighting unit 24 for reducing inter-antenna interference and inter-user interference. Note that the interference reduction is actually carried out through the both matrices C, W. The receive antennas 21, the transmit antennas 22, the canceling unit 23, the channel estimation unit 26 and the transmit power control unit 27 are the same as those in the first embodiment and thus are not repeatedly described.

The weighting unit 24 can multiply the feedforward type weighting matrix W. As stated above, the term "feedforward" means weighting (multiplying) operations in a main signal path.

The optimal weight matrix calculation unit 252 performs iterative calculations based on the channel matrices $H_1$, $H_2$ and G to optimize the canceling matrix C and the weighting matrix W at the radio communication apparatus RS20.

(2.2 Weight Matrix Optimization)

Next, an exemplary optimization scheme for optimizing the weighting matrix W and the canceling matrix C jointly at the radio communication apparatus RS20 according to the second embodiment is described. As stated above, precoding is performed at the radio communication apparatus BS10. Thus, the precoding matrix F being equal to $\sqrt{P_o/M} \cdot I$ is used at the radio communication apparatus BS10. In descriptions below, general formulae are first derived, and then a specific representation of the precoding matrix F is substituted.

A joint calculation scheme for the canceling matrix C and the weighting matrix W at the radio communication apparatus RS20 according to the second embodiment is designed to minimize a receive error rate and may be represented as $$\min_{C,W} tr\{E[(y-x) \cdot (y-x)^H]\} \quad (16)$$

$$\text{s.t. } tr\{E[(W(I+C-GW)^{-1}(H_1Fx+n_1)) \cdot (W(I+C-GW)^{-1}(H_1Fx+n_1))^H]\} = P_r,$$

where the first line in formula (16) represents to calculate the canceling matrix C and the weighting matrix W in order to minimize a mean square error between a received signal vector y and a transmitted signal vector x. The second line in the formula (16) represents a constraint that the total transmit power in the radio communication apparatus RS20 be equal to $P_r$ as described in conjunction with formula (5).

In order to derive optimal solutions for the canceling matrix C and the weighting matrix W, formula (16) is modified based on a Lagrangian Dual Problem as follows, $$L(C, W, \mu) = \quad (17)$$
$$tr\{E[(y-x) \cdot (y-x)^H]\} + \mu(tr\{E[(W(I+C-GW)^{-1}(H_1Fx+n_1)) \cdot (W(I+C-GW)^{-1}(H_1Fx+n_1))^H]\} - P_r),$$

where $\mu$ is a Lagrange multiplier.

The optimal solutions for the Lagrangian Dual Problem as indicated in formula (17) can be calculated by using a Karush-Kuhn-Tucker (KKT) condition as follows, $$\nabla_C L(C,W,\mu) = 0$$

$$\nabla_W L(C,W,\mu) = 0$$

$$\mu(tr\{E[(W(I+C-GW)^{-1}(H_1Fx+n_1)) \cdot (W(I+C-GW)^{-1}(H_1Fx+n_1))^H]\} - P_r) = 0 \quad (18).$$

Then, the matrix differential formulae (8) through (12) are applied, and the derived optimal solutions for formula (18) can be represented as $$C = \{[H_1FF^HH_1^H + \sigma_1^2 I][H_2^HF^HH_1^H]^{-1}[H_2^HH_2 + \mu I] + G\}W - I \quad (19)$$

$$W = \{[H_1FF^HH_1^H + \sigma_1^2 I][H_2^HF^HH_1^H]^{-1}[H_2^HH_2 + \mu I] + G\}^{-1}(I+C)$$

$$\mu = \frac{tr\{U\}}{P_r}$$

$$U = H_2^H[I - H_2W(I+C-GW)^{-1}H_1F][W(I+C-GW)^{-1}H_1F]^H - \sigma_1^2 H_2^H H_2[W(I+C-GW)^{-1}][W(I+C-GW)^{-1}]^H.$$

Referring to formula (19), the optimal solutions for the canceling matrix C and the weighting matrix W in the radio communication apparatus RS20 are not represented in closed forms. Thus, the optimal solutions may be derived through iterative approximations in accordance with an iterative numerical calculation algorithm.

Figure 6:
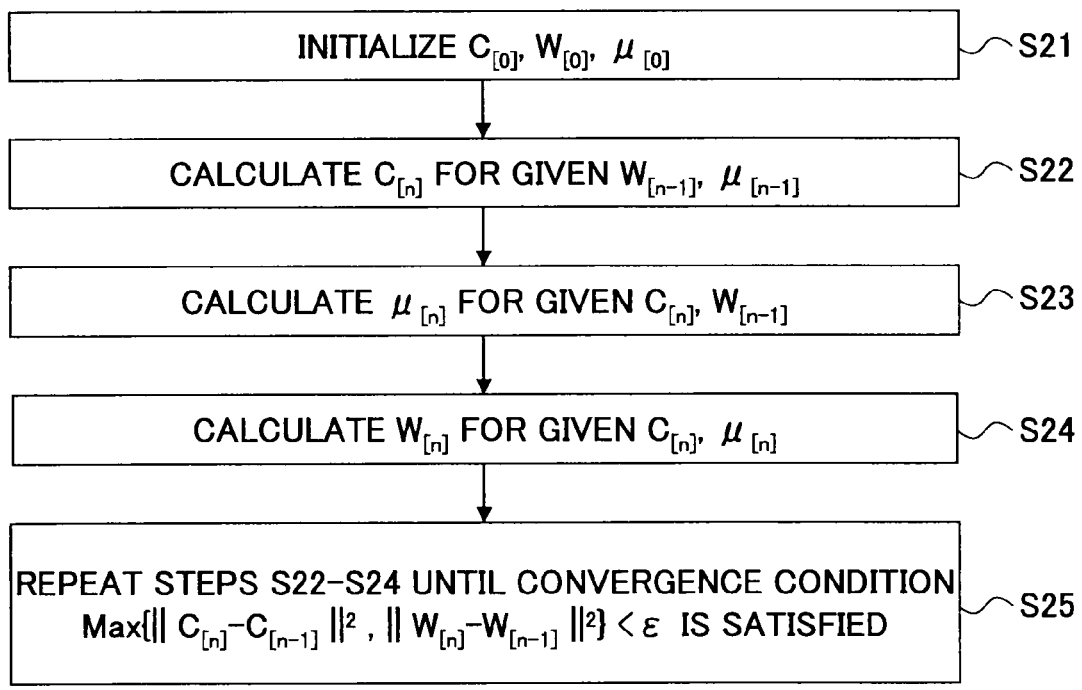
FIG. 6 is a flow diagram illustrating an exemplary operation to calculate optimal weight matrices in the radio communication apparatus according to the second embodiment.

FIG. 6 illustrates an exemplary operation for such an iterative numerical calculation algorithm. In the second embodiment, the precoding matrix is equal to $\sqrt{P_o/M} \cdot I$, which is substituted into the above formulae.

At step S21, the canceling matrix C, the weighting matrix W and the Lagrange multiplier $\mu$ are initialized. Subscripts used below mean the number of iterative updates.

At step S22, the first equation in formula (19) is calculated by using the previous Lagrange multiplier $\mu_{[n-1]}$ and the weighting matrix $W_{[n-1]}$ to update the canceling matrix C.

At step S23, the third and fourth equations in formula (19) are calculated by using the updated canceling matrix $C_{[n]}$ and the previous weighting matrix $W_{[n-1]}$ to update the Lagrange multiplier $\mu$.

At step S24, the second equation in formula (19) is calculated by using the updated canceling matrix $C_{[n]}$ and the Lagrange multiplier $\mu_{[n]}$ to update the weighting matrix W.

At step S25, it is determined whether the canceling matrix $C_{[n]}$ and the weighting matrix $W_{[n]}$ converge. Specifically, a first norm of differences between components of the presently derived canceling matrix $C_{[n]}$ and components of the previously derived canceling matrix $C_{[n-1]}$ is calculated. In addition, a second norm of differences between components of the presently derived weighting matrix $W_{[n]}$ and components of the previously derived weighting matrix $W_{[n-1]}$ is derived. If a greater one of the first norm and the second norm is smaller than $\epsilon$, it is determined that the canceling matrix $C_{[n]}$ and the weighting matrix $W_{[n]}$ have converged, and the algorithm ends. Otherwise, steps S22 through S24 are repeated. In order to avoid going into an infinite loop, the algorithm may be forced to terminate after a predefined number of iterations. The convergence determination is not limited to the above determination scheme, and any other appropriate determination criteria may be used.

(2.3 Control of Total Transmit Power)

The canceling matrix C derived through the algorithm as illustrated in FIG. 6 is used to adjust relay signals at the canceling unit 23. The adjusted signal v is then weighted at the weighting unit 24 in accordance with the calculated weighting matrix W. Signals supplied from the weighting unit 24 are transmitted under transmit power control by the transmit power control unit 27. This transmit power control is the same as the first embodiment and thus is not repeatedly described.

(2.4 Operation and Effect)

In this manner, it is assumed that the channel matrices $H_1$, $H_2$, G are considered for weight matrix optimization in the radio communication apparatus RS20 as illustrated in FIG. 2, and the canceling matrix C and the weighting matrix W are jointly optimized. Thus, the bit error rate performance for the overall system can be further improved. In addition, the total transmit power is controlled in the radio communication apparatus RS20, which may enable signals to be transmitted at the maximum transmit power allowed for the radio communication apparatus RS20. As a result, the bit error rate performance can be still further improved.

Third Embodiment

The third embodiment of the present invention (general F, W=I) is described below. Portions like the first and second embodiments are not repeatedly described. In the first embodiment, the feed-back type canceling matrix C is optimized at the radio communication apparatus RS20 having a radio relay function. In the third embodiment, the canceling matrix C as well as the precoding matrix F is optimized. In the third embodiment, however, the feed-forward type weighting matrix W is not used for weighting operations similar to the first embodiment. It is assumed that W=I.

(3.1 Radio Relay Apparatus)

Figure 7:
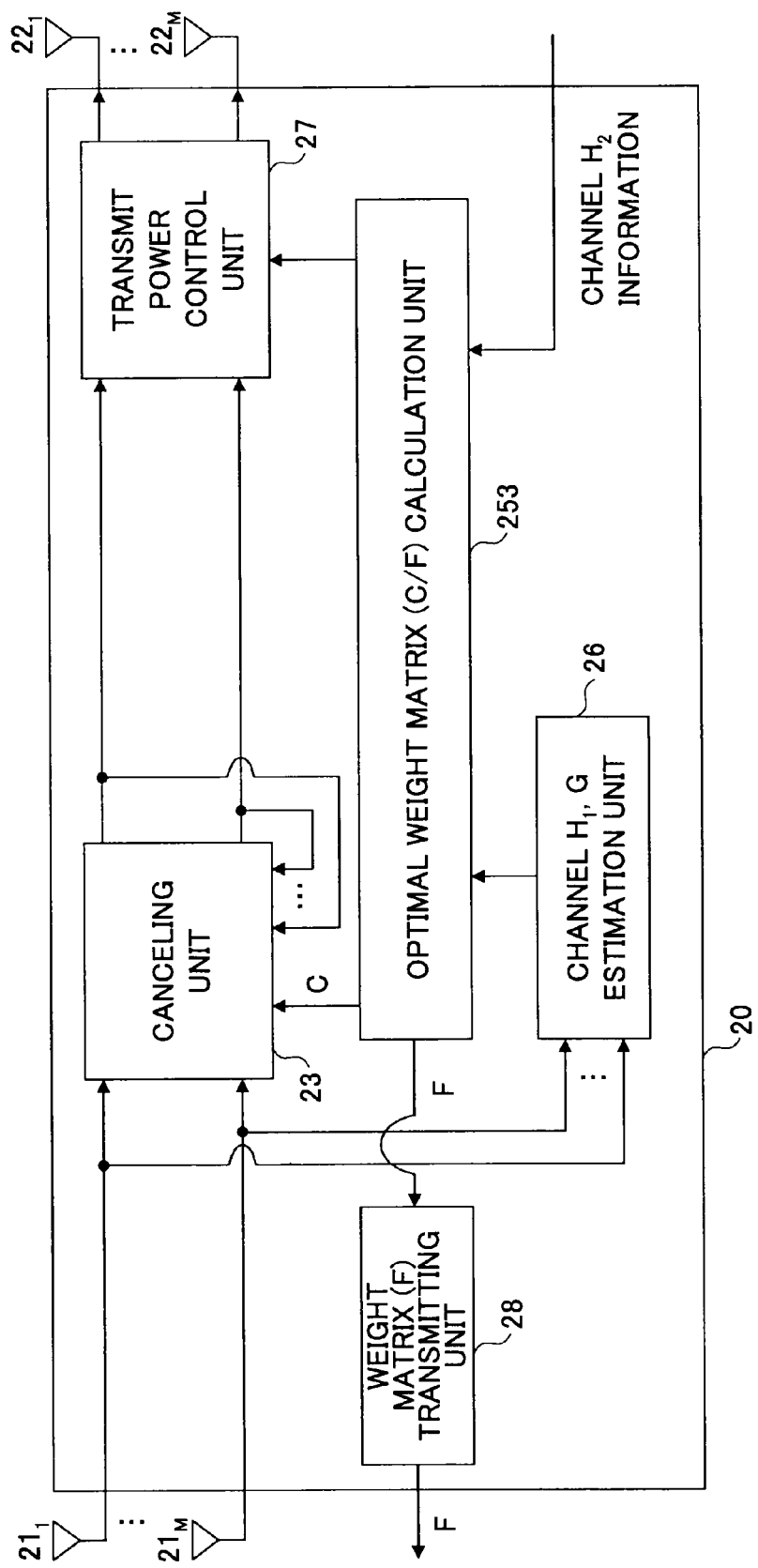
FIG. 7 illustrates an exemplary arrangement of a radio communication apparatus according to a third embodiment of the present invention.

FIG. 7 illustrates an exemplary functional arrangement of the radio communication apparatus RS20 according to this embodiment. Similar to the first embodiment, the radio communication apparatus RS20 includes receive antennas 21, transmit antennas 22, a canceling unit 23 for removing loop interference and reducing inter-antenna interference and inter-user interference, an optimal weight matrix calculation unit 253, a channel estimation unit 26 and a transmit power control unit 27. The third embodiment differs from the first embodiment in that the radio communication apparatus RS20 includes a weight matrix transmitting unit 28. The receive antennas 21, the transmit antennas 22, the canceling unit 23, the channel estimation unit 26 and the transmit power control unit 27 are the same as those of the first embodiment and thus are not repeatedly described.

The optimal weight matrix calculation unit 253 optimizes the canceling matrix C in the radio communication apparatus RS20 and the precoding matrix F in the radio communication apparatus BS10 through iterative operations based on the channel matrices $H_1$, $H_2$ and G.

The weight matrix transmitting unit 28 transmits the precoding matrix F derived at the optimal weight matrix calculation unit 253 to the radio communication apparatus BS10. The radio communication apparatus BS10 receives the derived precoding matrix F and updates the currently possessed precoding matrix F. The updated precoding matrix F is used for subsequent signal transmissions.

(3.2 Weight Matrix Optimization)

Next, an exemplary optimization scheme for optimizing the canceling matrix C and the precoding matrix F jointly in the radio communication apparatus RS20 according to the third embodiment is described below. A joint calculation scheme for the canceling matrix C and the precoding matrix F is designed to minimize a receive error rate and may be represented as $$\min_{C,F} tr\{E[(y-x) \cdot (y-x)^H]\} \quad (20)$$

$$\text{s.t.} \quad tr\{E[F \cdot F^H]\} = P_0$$

$$tr\{E[(W(I+C-GW)^{-1}(H_1 Fx + n_1)) \cdot (W(I+C-GW)^{-1}(H_1 Fx + n_1))^H]\} = P_r,$$

where $P_0$ represents the total transmit power in the radio communication apparatus BS10. The first line in formula (20) represents that the canceling matrix C and the precoding matrix F are calculated to minimize a mean square error between a received signal vector y and a transmitted signal vector x. The second line in formula (20) represents a constraint that the total transmit power in the radio communication apparatus BS10 be equal to $P_0$. The third line in formula (20) represents a constraint that the total transmit power in the radio communication apparatus RS20 be equal to $P_r$.

In order to derive optimal solutions for the canceling matrix C and the precoding matrix F, formula (20) is modified based on a Lagrangian Dual Problem as follows, $$L(C, F, \mu_1, \mu_2) = tr\{E[(y-x) \cdot (y-x)^H]\} + \quad (21)$$

$$\mu_1(tr\{E[F \cdot F^H]\} - P_0) + \mu_2(tr\{E[(W(I+C-GW)^{-1}(H_1 Fx + n_1)) \cdot (W(I+C-GW)^{-1}(H_1 Fx + n_1))^H]\} - P_r),$$

where $\mu_1$, $\mu_2$ are Lagrange multipliers.

The optimal solutions for the Lagrangian Dual Problem as represented in formula (21) can be calculated by using a Karush-Kuhn-Tucker (KKT) condition as represented in formula (22), $$\nabla_C L(C, F, \mu_1, \mu_2) = 0$$

$$\nabla_F L(C, F, \mu_1, \mu_2) = 0$$

$$\mu_1(tr\{E[F \cdot F^H]\} - P_0) = 0$$

$$\mu_2(tr\{E[(W(I+C-GW)^{-1}(H_1 Fx + n_1)) \cdot (W(I+C-GW)^{-1}(H_1 Fx + n_1))^H]\} - P_r) = 0 \quad (22).$$

Then, the matrix differential formulae indicated in formulae (8) through (12) are applied, and the optimal solutions for formula (22) can be represented as $$C = \{[H_1 FF^H H_1^H + \sigma_1^2 I][H_2^H F^H H_1^H]^{-1}[H_2^H H_2 + \mu_2 I] + G\}W - I \quad (23)$$

$$F = \{[W(I + C - GW)^{-1} H_1]^H [H_2^H H_2 + \mu_2 I]W(I + C - GW)^{-1} H_1 + \mu_1 I\}^{-1}$$
$$\cdot [H_2 W(I + C - GW)^{-1} H_1]^H$$

$$\mu_1 = \frac{tr\{U_1\}}{P_0}$$

$$U_1 = [W(I + C - GW)^{-1} H_1]^H H_2^H [I - H_2 W(I + C - GW)^{-1} H_1 F] F^H -$$
$$\mu_2 [W(I + C - GW)^{-1} H_1]^H [W(I + C - GW)^{-1} H_1] FF^H$$

$$\mu_2 = \frac{tr\{U_2\}}{P_r}$$

$$U_2 = H_2^H [I - H_2 W(I + C - GW)^{-1} H_1 F][W(I + C - GW)^{-1} H_1 F]^H -$$
$$\sigma_1^2 H_2^H H_2 [W(I + C - GW)^{-1}][W(I + C - GW)^{-1}]^H.$$

Referring to formula (23), the optimal solutions for the canceling matrix C and the precoding matrix F are not represented in closed forms. Thus, the optimal solutions may be derived through iterative approximations in accordance with an iterative numerical calculation algorithm.

Figure 8:
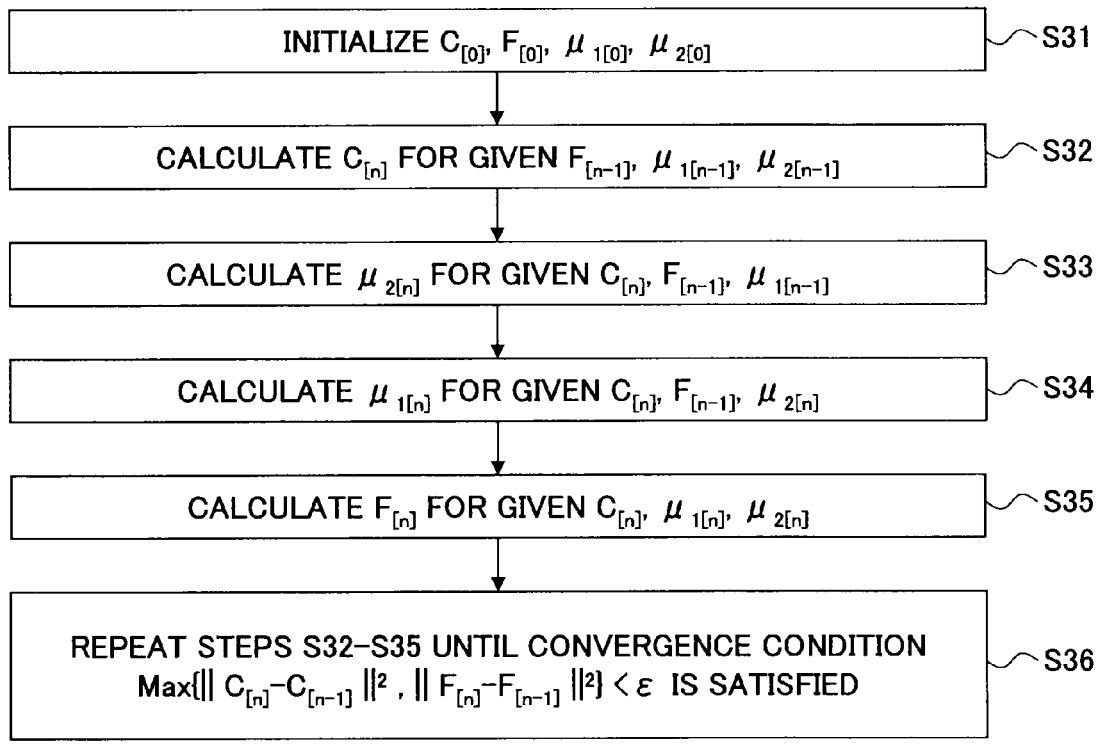
FIG. 8 is a flow diagram illustrating an exemplary operation to calculate optimal weight matrices in the radio communication apparatus according to the third embodiment.

FIG. 8 illustrates an exemplary operation of the iterative numerical calculation algorithm. In the third embodiment, the weighting matrix W is equal to I, which is substituted into the above equations.

At step S31, the canceling matrix C, the precoding matrix F and the first and second Lagrange multipliers $\mu_1$, $\mu_2$ are initialized. In the illustration, subscripts represent the number of iterations.

At step S32, the first equation in formula (23) is calculated by using the previous first and second Lagrange multipliers $\mu_{1[n-1]}$, $\mu_{2[n-1]}$ and the precoding matrix $F_{[n-1]}$ to update the canceling matrix C.

At step S33, the fifth and sixth equations in formula (23) are calculated by using the updated canceling matrix $C_{[n]}$, the previous precoding matrix $F_{[n-1]}$ and the first Lagrange multiplier $\mu_{1[n-1]}$ to update the second Lagrange multiplier $\mu_2$.

At step S34, the third and fourth equations in formula (23) are calculated by using the updated canceling matrix $C_{[n]}$, the previous precoding matrix $F_{[n-1]}$ and the updated second Lagrange multiplier $\mu_{2[n]}$ to update the first Lagrange multiplier $\mu_1$.

At step S35, the second equation in formula (23) is calculated by using the updated canceling matrix $C_{[n]}$ and the first and second Lagrange multipliers $\mu_{1[n]}$, $\mu_{2[n]}$ to up date the precoding matrix F.

At step S36, it is determined whether the canceling matrix $C_{[n]}$ and the precoding matrix $F_{[n]}$ converge. Specifically, a first norm of differences between components of the presently derived canceling matrix $C_{[n]}$ and components of the previously derived canceling matrix $C_{[n-1]}$ is derived. In addition, a second norm of differences between components of the presently derived precoding matrix $F_{[n]}$ and components of the previously derived precoding matrix $F_{[n-1]}$ is derived. If a greater one of the first norm and the second norm is smaller than $\epsilon$, it is determined that the canceling matrix $C_{[n]}$ and the precoding matrix $F_{[n]}$ have converged, and the algorithm ends. Otherwise, steps S32 through S35 are repeated. In order to avoid going into an infinite loop, the algorithm may be forced to terminate after a predefined number of iterations. The convergence determination is not limited to the above determination scheme, and any other appropriate determination criteria may be used.

(3.3 Control of Total Transmit Power)

The canceling unit 23 uses the canceling matrix C calculated in accordance with the algorithm as illustrated in FIG. 8 to adjust relay signals. The adjusted signals are transmitted under power control by the transmit power control unit 27. This transmit power control is the same as the first embodiment and thus is not repeatedly described.

In this embodiment, the optimal weight matrix calculation unit 253 also updates the precoding matrix F. The weight matrix transmitting unit 28 transmits the updated precoding matrix F to the radio communication apparatus BS10. The radio communication apparatus BS10 limits the total transmit power to $P_0$. Thus, the radio communication apparatus BS10 multiplies outputs from the precoding unit 12 with $$\sqrt{P_0/P_{0,pro}} \quad (24),$$

where $P_{0,pro}$ represents power before the total transmit power control and may be represented as $$P_{0,pro} = tr\{FF^H\} \quad (25).$$

Then, the radio communication apparatus BS10 transmits the processed signals.

(3.4 Operation and Effect)

In this manner, it is assumed that the channel matrices $H_1$, $H_2$, G are considered for weight matrix optimization in the radio communication apparatus RS20. The canceling matrix C and the precoding matrix F are jointly optimized. Thus, a bit error rate performance for the overall system can be further improved. Also, the total transmit power is controlled in the radio communication apparatuses BS10 and RS20, and thus signals can be transmitted at the maximum transmit power allowed for the radio communication apparatuses BS10 and RS20. As a result, the bit error rate performance can be still further improved.

Fourth Embodiment

The fourth embodiment of the present invention (general F, W≠I) is described below. In the fourth embodiment, the precoding matrix F and the weighting matrix W as well as the canceling matrix C are jointly optimized.

(4.1 Radio Relay Apparatus)

Figure 9:
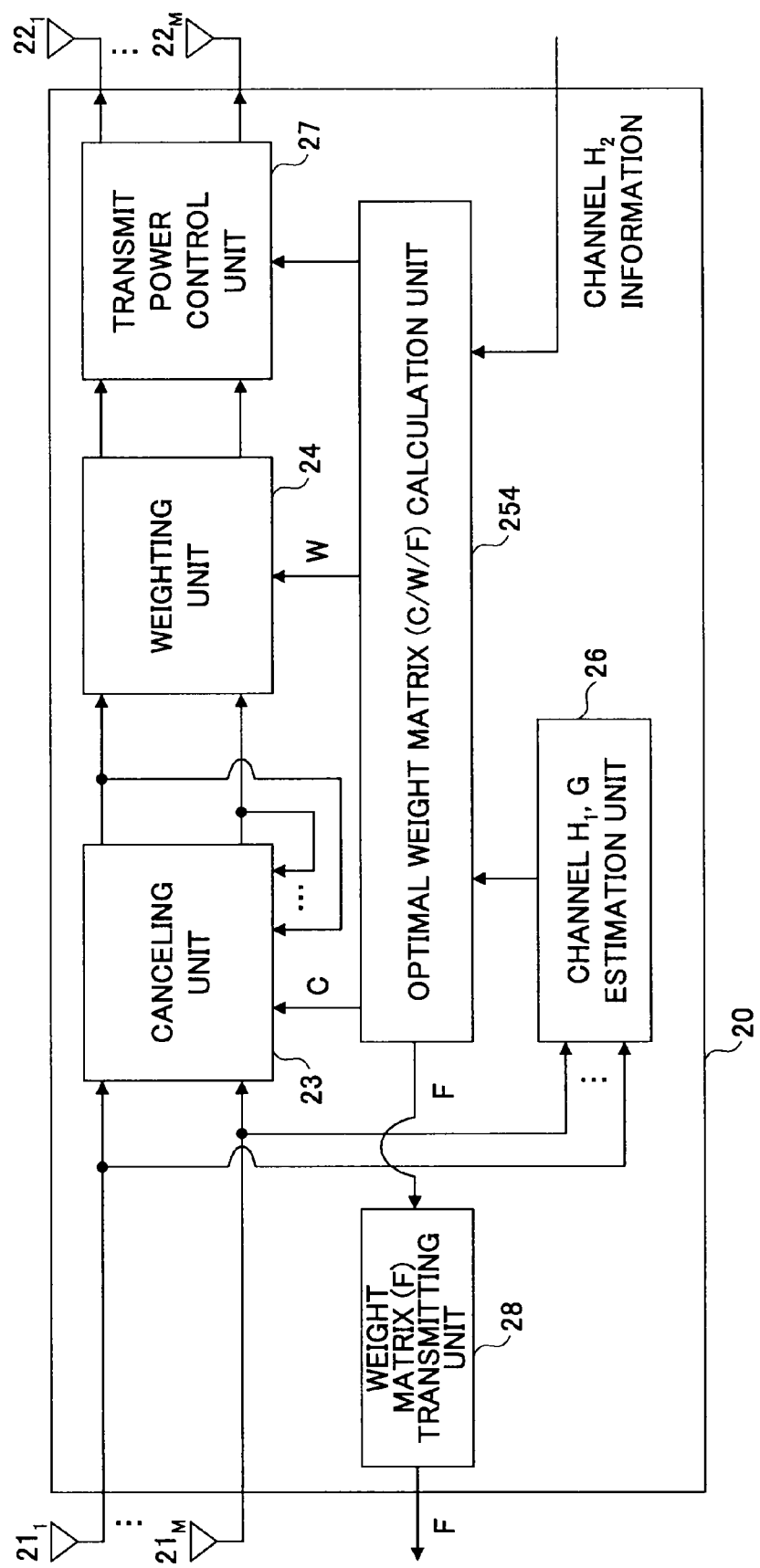
FIG. 9 illustrates an exemplary arrangement of a radio communication apparatus according to a fourth embodiment of the present invention.

FIG. 9 illustrates an exemplary arrangement of the radio communication apparatus RS20 having a radio relay function according to this embodiment. Similar to the first embodiment, the radio communication apparatus RS20 includes receive antennas 21, transmit antennas 22, a canceling unit 23 for removing loop interference, an optimal weight matrix calculation unit 254, a channel estimation unit 26 and a transmit power control unit 27. The radio communication apparatus RS20 differs from the first embodiment in that it includes a weighting unit 24 for reducing inter-antenna interference and inter-user interference and a weight matrix transmitting unit 28.

The receive antennas 21, the transmit antennas 22, the canceling unit 23, the channel estimation unit 26 and the transmit power control unit 27 are the same as those in the first embodiment and thus are not repeatedly described. Also, the weighting unit 24 is the same as that in the second embodiment and thus is not repeatedly described. Furthermore, the weight matrix transmitting unit 28 is the same as that in the third embodiment and thus is not repeatedly described.

The optimal weight matrix calculation unit 254 jointly optimizes the canceling matrix C and the weighting matrix W in the radio communication apparatus RS20 and the precoding matrix F in the radio communication apparatus BS10 through iterative operations based on the channel matrices $H_1$, $H_2$ and G.

(4.2 Weight Matrix Optimization)

Next, an exemplary optimization scheme for optimizing the canceling matrix C, the weighting matrix W and the precoding matrix F jointly in the radio communication apparatus RS20 according to the fourth embodiment is described below. Similar to the first embodiment, the optimization scheme is designed to minimize a receive error rate and may be represented as $$\min_{C,W,F} tr\{E[(y-x)\cdot(y-x)^H]\} \quad (26)$$
$$\text{s.t.} \quad tr\{E[F\cdot F^H]\} = P_0$$
$$tr\{E[(W(I+C-GW)^{-1}(H_1Fx+n_1))\cdot$$
$$(W(I+C-GW)^{-1}(H_1Fx+n_1))^H]\} = P_r,$$

where the first line in formula (26) represents that the canceling matrix C, the weighting matrix W and the precoding matrix F are calculated to minimize a mean square error for a received signal vector y and a transmitted signal vector x. The second line in formula (26) represents a constraint that the total transmit power in the radio communication apparatus BS10 be equal to $P_0$. The third line in formula (26) represents a constraint that the total transmit power in the radio communication apparatus RS20 be equal to $P_r$.

In order to derive optimal solutions for the canceling matrix C, the weighting matrix W and the precoding matrix F, formula (26) is modified based on a Lagrangian Dual Problem represented as $$L(C,W,F,\mu_1,\mu_2) = tr\{E[(y-x)\cdot(y-x)^H]\} + \quad (27)$$
$$\mu_1(tr\{E[F\cdot F^H]\} - P_0) + \mu_2(tr\{E[(W(I+C-GW)^{-1}(H_1Fx+n_1))\cdot$$
$$(W(I+C-GW)^{-1}(H_1Fx+n_1))^H]\} - P_r),$$

where $\mu_1$, $\mu_2$ are the first and second Lagrange multipliers, respectively.

The optimal solutions for the Lagrangian Dual Problem as represented in formula (27) can be derived by using a Karush-Kuhn-Tucker (KKT) condition represented as $$\nabla_C L(C,W,F,\mu_1,\mu_2)=0$$
$$\nabla_W L(C,W,F,\mu_1,\mu_2)=0$$
$$\nabla_F L(C,W,F,\mu_1,\mu_2)=0$$
$$\mu_1(tr\{E[F\cdot F^H]\}-P_0)=0$$
$$\mu_2(tr\{E[(W(I+C-GW)^{-1}(H_1Fx+n_1))\cdot(W(I+C-GW)^{-1}$$
$$(H_1Fx+n_1))^H]\}-P_r)=0 \quad (28)$$

Then, matrix differential formulae (8) through (12) are applied, and the optimal solutions for formula (28) can be represented as $$C = \{[H_1 FF^H H_1^H + \sigma_1^2 I][H_2^H F^H H_1^H]^{-1}[H_2^H H_2 + \mu_2 I] + G\}W - I \quad (29)$$

$$W = \{[H_1 FF^H H_1^H + \sigma_1^2 I][H_2^H F^H H_1^H]^{-1}[H_2^H H_2 + \mu_2 I] + G\}^{-1}(I+C)$$

$$F =$$
$$\{[W(I+C-GW)^{-1}H_1]^H[H_2^H H_2 + \mu_2 I]W(I+C-GW)^{-1}H_1 + \mu_1 I\}^{-1}$$
$$\cdot [H_2 W(I+C-GW)^{-1}H_1]^H$$

$$\mu_1 = \frac{tr\{U_1\}}{P_0}$$

$$U_1 =$$
$$[W(I+C-GW)^{-1}H_1]^H H_2^H [I - H_2 W(I+C-GW)^{-1}H_1 F]F^H -$$
$$\mu_2 [W(I+C-GW)^{-1}H_1]^H [W(I+C-GW)^{-1}H_1]FF^H$$

$$\mu_2 = \frac{tr\{U_2\}}{P_r}$$

$$U_2 =$$
$$H_2^H[I - H_2 W(I+C-GW)^{-1}H_1 F][W(I+C-GW)^{-1}H_1 F]^H -$$
$$\sigma_1^2 H_2^H H_2 [W(I+C-GW)^{-1}][W(I+C-GW)^{-1}]^H.$$

Referring to formula (29), the optimal solutions for the canceling matrix C, the weighting matrix W and the precoding matrix F are not represented in closed forms. Thus, the optimal solutions are derived through iterative approximations in accordance with an iterative numerical calculation algorithm.

Figure 10:
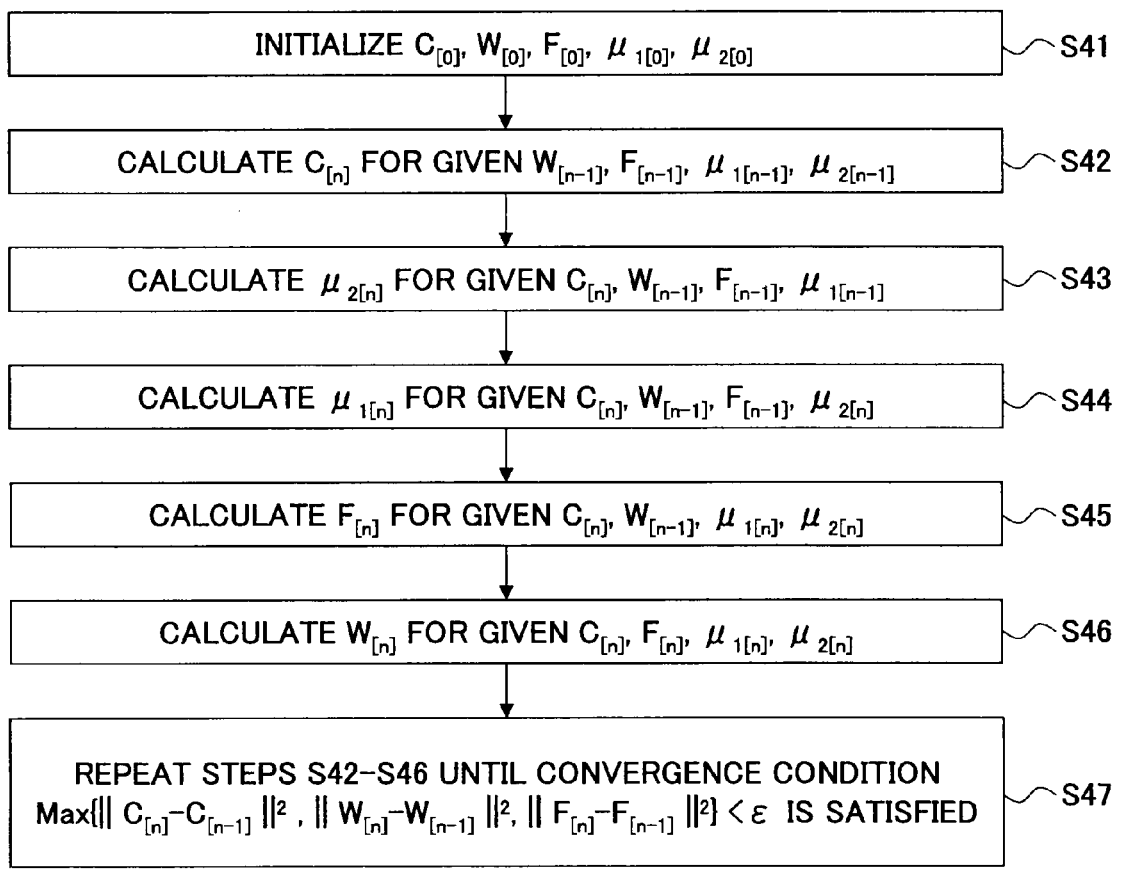
FIG. 10 is a flow diagram illustrating an exemplary operation to calculate optimal weight matrices in the radio communication apparatus according to the fourth embodiment.

FIG. 10 illustrates an exemplary operation of such an interactive numerical calculation algorithm.

At step S41, the canceling matrix C, the weighting matrix W, the precoding matrix F and the first and second Lagrange multipliers $\mu_1$, $\mu_2$ are initialized. In the illustration, subscripts represent the number of iterations.

At step S42, the first equation in formula (29) is calculated by using the previous weighting matrix $W_{[n-1]}$, the previous precoding matrix $F_{[n-1]}$ and the previous Lagrange multipliers $\mu_{1[n-1]}$, $\mu_{2[n-1]}$ to update the canceling matrix C.

At step S43, the sixth and seventh equations in formula (29) are calculated by using the updated canceling matrix $C_{[n]}$, the previous weighting matrix $W_{[n-1]}$, the previous precoding matrix $F_{[n-1]}$ and the previous first Lagrange multiplier $\mu_{1[n-1]}$ to up date the Lagrange multiplier $\mu_2$.

At step S44, the fourth and fifth equations in formula (29) are calculated by using the updated canceling matrix $C_{[n]}$, the previous weighting matrix $W_{[n-1]}$, the previous precoding matrix $F_{[n-1]}$ and the updated second Lagrange multiplier $\mu_{2[n]}$ to update the first Lagrange multiplier $\mu_1$.

At step S45, the third equation in formula (29) is calculated by using the updated canceling matrix $C_{[n]}$, the previous weighting matrix $W_{[n-1]}$ and the updated first and second Lagrange multipliers $\mu_{1[n]}$, $\mu_{2[n]}$ to up date the precoding matrix F.

At step S46, the second equation in formula (29) is calculated by using the updated canceling matrix $C_{[n]}$, the updated precoding matrix $F_{[n]}$ and the updated first and second Lagrange multipliers $\mu_{1[n]}$, $\mu_{2[n]}$ to up date the weighting matrix W.

At step S47, it is determined whether components of the canceling matrix $C_{[n]}$, the weighting matrix $W_{[n]}$ and the precoding matrix $F_{[n]}$ have converged. Specifically, a first norm of differences between components of the presently derived canceling matrix $C_{[n]}$ and components of the previously derived canceling matrix $C_{[n-1]}$ is derived. Also, a second norm of differences between components of the presently derived weighting matrix $W_{[n]}$ and components of the previously derived weighting matrix $W_{[n-1]}$ is derived. Furthermore, a third norm of differences between components of the presently derived precoding matrix $F_{[n]}$ and components of the previously derived precoding matrix $F_{[n-1]}$ is derived. If the greatest one of the first, second and third norms is smaller than $\epsilon$, it is determined that the components of the canceling matrix $C_{[n]}$, the weighting matrix $W_{[n]}$ and the precoding matrix $F_{[n]}$ have converged, and the algorithm ends. Otherwise, steps S42 through S47 are repeated. In order to avoid going into an infinite loop, the algorithm may be forced to terminate after a predefined number of iterations. The determination on convergence is not limited to the above determination scheme, and any other appropriate determination criteria may be used.

(4.3 Control of Total Transmit Power)

Signals relayed by the radio communication apparatus RS20 are adjusted in accordance with the above-mentioned scheme using the matrices C, F and W calculated through the algorithm as illustrated in FIG. 10 and transmitted at the total transmit power controlled by the transmit power control unit 27. The total transmit power is controlled for outputs from the precoding unit 12 in the radio communication apparatus BS10. The total transmit power in the radio communication apparatus RS20 is controlled similar to the first embodiment and thus is not repeatedly described. Also, the total transmit power in the radio communication apparatus BS10 is controlled similar to the third embodiment and thus is not repeatedly described.

(4.4 Operation and Effect)

In this manner, it is assumed that the channel matrices $H_1$, $H_2$ and G are considered for weight matrix optimization as illustrated in FIG. 2, and the weighting matrix W and the precoding matrix F as well as the canceling matrix C are jointly optimized. As a result, a bit error rate performance for the overall system can be significantly improved. Also, the total transmit power is controlled in the radio communication apparatuses BS10 and RS20, and thus signals can be transmitted at the respective maximum transmit power allowed for the radio communication apparatuses BS10 and RS20. Thus, the bit error rate performance can be further improved.

Fifth Embodiment

In the above embodiments, downlink communications have been described for convenience. However, the present invention is not limited to the downlink communications and may be applied to uplink communications.

Figure 11:
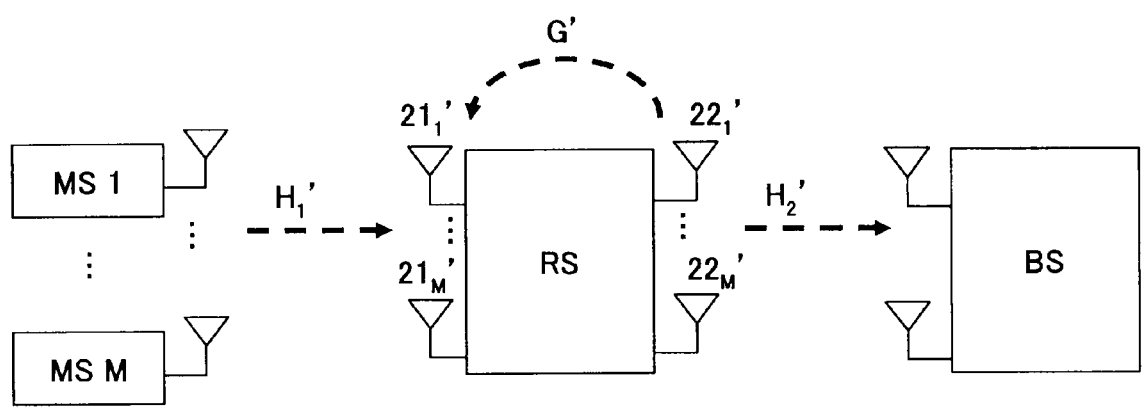
FIG. 11 illustrates an exemplary arrangement of a radio relay system for uplinks according to one embodiment of the present invention.

FIG. 11 illustrates an exemplary system arrangement for the case where the present invention is applied to uplink communications. The illustrated system arrangement is substantially the same as the illustration in FIG. 1 except that a forward channel $H_1'$ represents channel characteristics for radio links from radio communication apparatuses MS1 through MSM serving as mobile stations to a radio communication apparatus RS having a radio relay function. A backward channel $H_2'$ represents channel characteristics for radio links from the radio communication apparatus RS to a radio communication apparatus BS serving as a base station. A loop channel G' represents channel characteristics for radio links from uplink transmit antennas to uplink receive antennas in the radio communication apparatus RS.

Figure 12:
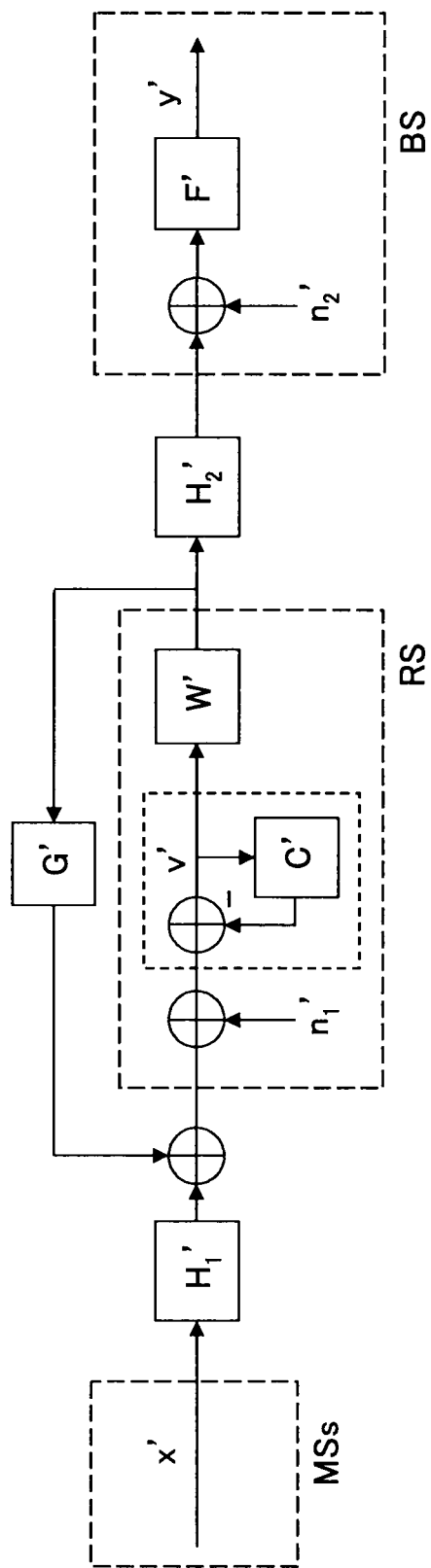
FIG. 12 is a block diagram schematically illustrating operations in the radio relay system in FIG. 11 according to one embodiment of the present invention.
Figure 13:
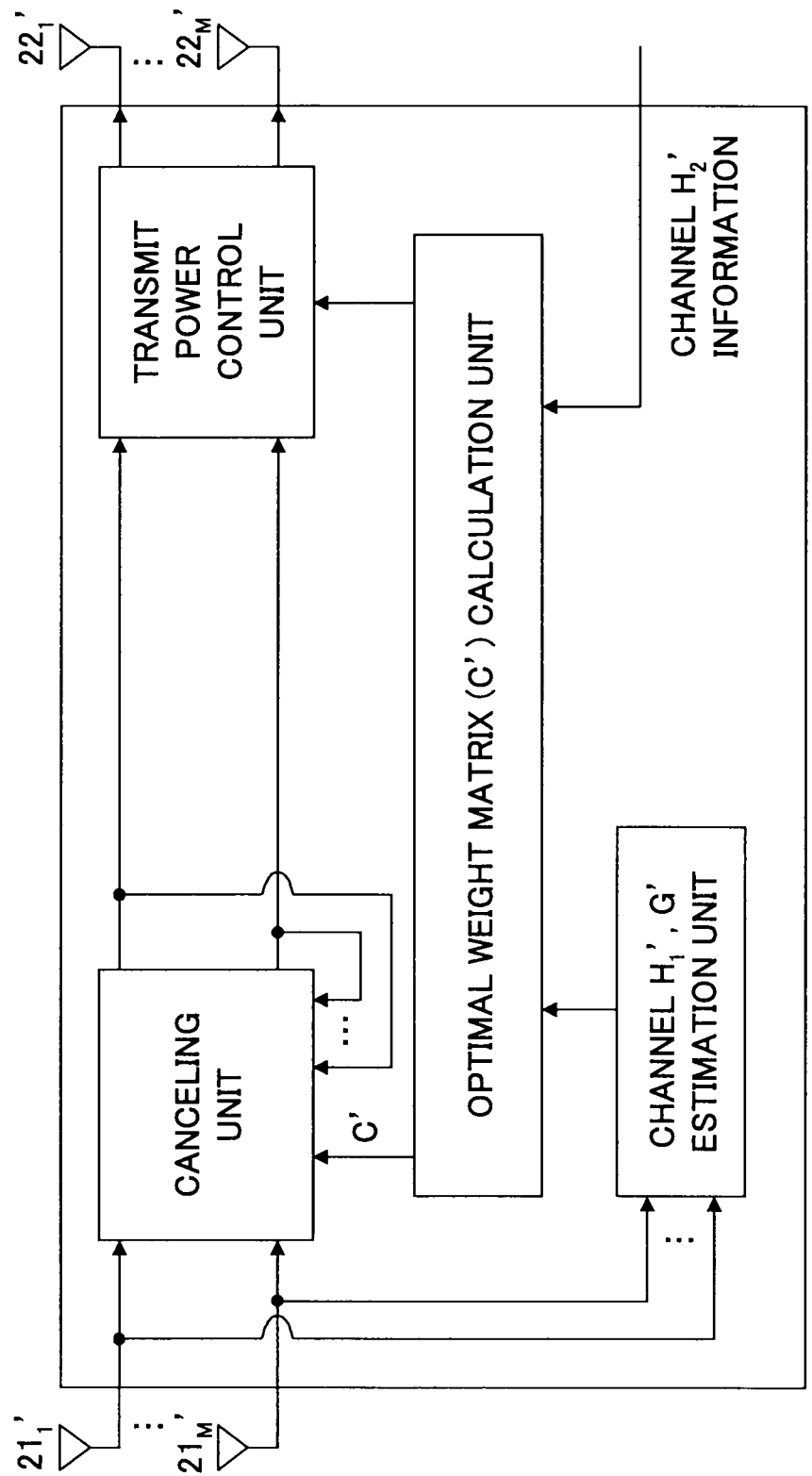
FIG. 13 illustrates an exemplary arrangement of a radio communication apparatus for use in the radio relay system in FIG. 11 according to one embodiment of the present invention.

FIG. 12 a block diagram schematically illustrating the system arrangement in FIG. 11. As seen from comparison between FIG. 2 and FIG. 12, signal processing schemes in the radio communication apparatus RS for downlinks and uplinks are the substantially same. Thus, the radio communication apparatus RS could be illustrated in FIG. 13 as in FIG. 3. In any of uplink and downlink communications, the precoding matrices F, F' are transmitted to the radio communication apparatus BS, but the radio communication apparatus BS is in the upstream side for the downlink communications while the radio communication apparatus BS is in the downstream side for the uplink communications.

In the above embodiments, the radio relay system includes multiple mobile terminals (radio communication apparatuses) having a single antenna, but the present invention is not limited to the embodiments. For example, the radio relay system may include one or more radio communication apparatuses MS30 having multiple antennas.

In the above embodiments, some schemes for reducing loop interference, inter-antenna interference and inter-user interference to minimize a receive error rate have been described, but the present invention is not limited to the embodiments. For example, the loop interference, the inter-antenna interference and the inter-user interference may be reduced to maximize a receive capacity.

The present invention may be applied to any systems suitable for extending coverage by relaying radio signals in accordance with MIMO scheme. For example, the present invention may be applied to HSDPA/HSUPA based W-CDMA systems, LTE based systems, IMT-Advanced based systems, WiMAX systems, Wi-Fi systems and/or others.

The present invention has been described with reference to the specific embodiments, but statements, formulae and illustrations being a part of the present disclosure should not be interpreted to limit the present invention. The embodiments are simply illustrative and variations, modifications, alterations and substitutions could be contrived by those skilled in the art without deviating from the spirit of the present invention. Some specific numerical values are used to prompt understandings of the present invention. However, these numerical values are simply illustrative unless specifically stated otherwise, and any other appropriate formula may be used. Segmentation of the embodiments or sections is not essential to the present invention. Two or more of the embodiments or sections may be combined as needed. For convenience, the apparatuses according to the embodiments of the present invention are described with reference to block diagrams but may be implemented in hardware, software or combinations thereof.

This application is based upon and claims the benefit of priority of the prior Japanese Patent Application No. 2008-231469, filed on Sep. 9, 2008, the entire contents of which are incorporated herein by reference.

What is claimed is:

1. A radio relay apparatus for receiving signals from a transmitter via multiple receive antennas and transmitting relay signals derived from the received signals to a receiver via multiple transmit antennas, comprising:

a channel estimation unit configured to estimate a forward channel matrix $H_1$ and a loop channel matrix G, the forward channel matrix $H_1$ representing radio channel characteristics between the transmitter and the radio relay apparatus, the loop channel matrix G representing interference occurring in the relay signals due to concurrently transmitting and receiving signals at the radio relay apparatus;

a weight optimization unit configured to derive a canceling matrix C through iterative operations using the forward channel matrix $H_1$, the loop channel matrix G and a backward channel matrix $H_2$ representing radio channel characteristics between the radio relay apparatus and the receiver; and a feedback compensation unit configured to subtract a signal weighted in accordance with the canceling matrix C in a feedback path from a relay signal in a main signal path to adjust the relay signal.

2. The radio relay apparatus as claimed in claim 1, wherein the weight optimization unit is configured to perform the iterative operations by iteratively updating the canceling matrix C to minimize an average error between a signal y transmitted from the transmitter and a signal x received at the receiver subject to a constraint that an average total transmit power toward the receiver be equal to a predefined value $P_r$.

3. The radio relay apparatus as claimed in claim 2, wherein the canceling matrix C is updated using a pre-update Lagrange multiplier μ in accordance with $$C = \{[H_1 F F^H H_1^H + \sigma_1^2 I][H_2^H F^H H_1^H]^{-1}[H_2^H H_2 + \mu I] + G\}W - I, \text{and}$$

the Lagrange multiplier μ is updated using the updated canceling matrix C in accordance with $$\mu = tr\{U\}/P_r,$$
$$U = H_2^H[I - H_2 W(I + C - GW)^{-1} H_1 F][W(I + C - GW)^{-1} H_1 F]^H -$$
$$\sigma_1^2 H_2^H H_2 [W(I + C - GW)^{-1}][W(I + C - GW)^{-1}]^H,$$

where $H_1$ represents the forward channel matrix, $H_2$ represents the backward channel matrix, G represents the loop channel matrix, C represents the canceling matrix, F represents a precoding matrix proportional to an identity matrix, W represents a weighting matrix used for weighting in the main signal path, I represents the identity matrix, μ represents the Lagrange multiplier, $P_r$ represents the predefined value for the total transmit power, and $\sigma_1^2$ represents thermal noise power.

4. The radio relay apparatus as claimed in claim 1, further comprising:

a feedforward compensation unit configured to weight the relay signal in the main signal path in accordance with a weighting matrix W to adjust the relay signal, wherein the weight optimization unit is configured to perform the iterative operations using the forward channel matrix $H_1$, the backward channel matrix $H_2$ and the loop channel matrix G to derive the canceling matrix C and the weighting matrix W.

5. The radio relay apparatus as claimed in claim 4, wherein the weight optimization unit is configured to perform the iterative operations by iteratively updating the canceling matrix C and the weighting matrix W to minimize the average error between the signal y transmitted from the transmitter and the signal x received at the receiver subject to the constraint that the average total transmit power toward the receiver be equal to the predefined value $P_r$.

6. The radio relay apparatus as claimed in claim 5, wherein the canceling matrix C is updated using a pre-update Lagrange multiplier μ and the weighting matrix W in accordance with $$C = \{[H_1 F F^H H_1^H + \sigma_1^2 I][H_2^H F^H H_1^H]^{-1}[H_2^H H_2 + \mu I] + G\}W - I, \text{and}$$

the Lagrange multiplier μ is updated using the updated canceling matrix C and a pre-update weighting matrix W in accordance with $$\mu = tr\{U\}/P_r,$$
$$U = H_2^H[I - H_2 W(I + C - GW)^{-1} H_1 F][W(I + C - GW)^{-1} H_1 F]^H, \text{and}$$
$$-\sigma_1^2 H_2^H H_2 [W(I + C - GW)^{-1}][W(I + C - GW)^{-1}]^H$$

the weighting matrix W is updated using the updated canceling matrix C and the updated Lagrange multiplier μ in accordance with $$W = \{[H_1 F F^H H_1^H + \sigma_1^2 I][H_2^H F^H H_1^H]^{-1}[H_2^H H_2 + \mu I] + G\}^{-1}(I + C),$$

where $H_1$ represents the forward channel matrix, $H_2$ represents the backward channel matrix, G represents the loop channel matrix, C represents the canceling matrix, F represents a precoding matrix proportional to an identity matrix, W represents a weighting matrix used for weighting in the main signal path, I represents the identity matrix, μ represents the Lagrange multiplier, $P_r$ represents the predefined value for the total transmit power, and $\sigma_1^2$ represents thermal noise power.

7. The radio relay apparatus as claimed in claim 1, further comprising:

a transmitting unit configured to transmit a precoding matrix F used for precoding in the transmitter to the transmitter, wherein the weight optimization unit is configured to perform the iterative operations using the forward channel matrix $H_1$, the backward channel matrix $H_2$ and the loop channel matrix G to derive the canceling matrix C and the precoding matrix F.

8. The radio relay apparatus as claimed in claim 7, wherein the weight optimization unit is configured to perform the iterative operations by iteratively updating the canceling matrix C and the precoding matrix F to minimize the average error between the signal y transmitted from the transmitter and the signal x received at the receiver subject to constraints that average total transmit power from the transmitter be equal to a predefined value $P_0$ and that average total transmit power toward the receiver be equal to a predefined value $P_r$.

9. The radio relay apparatus as claimed in claim 8, wherein the canceling matrix C is updated using a pre-update first Lagrange multiplier $\mu_1$, a pre-update second Lagrange multiplier $\mu_2$ and the precoding matrix F in accordance with $$C = \{[H_1 F F^H H_1^H + \sigma_1^2 I][H_2^H F^H H_1^H]^{-1}[H_2^H H_2 + \mu_2 I] + G\}W - I, \text{and}$$

the second Lagrange multiplier $\mu_2$ is updated using the updated canceling matrix C, a pre-update precoding matrix F and a pre-update first Lagrange multiplier $\mu_1$ in accordance with $$\mu_2 = tr\{U_2\}/P_r,$$
$$U_2 = H_2^H[I - H_2 W(I + C - GW)^{-1} H_1 F][W(I + C - GW)^{-1} H_1 F]^H,$$
$$-\sigma_1^2 H_2^H H_2 [W(I + C - GW)^{-1}][W(I + C - GW)^{-1}]^H$$

and the first Lagrange multiplier $\mu_1$ is updated using the updated canceling matrix C, the pre-update precoding matrix F and the updated second Lagrange multiplier $\mu_2$ in accordance with $$\mu_1 = tr\{U_1\}/P_0,$$
$$U_1 = [W(I+C-GW)^{-1}H_1]^H H_2^H[I-H_2W(I+C-GW)^{-1}H_1F]F^H,$$
$$-\mu_2[W(I+C-GW)^{-1}H_1]^H[W(I+C-GW)^{-1}H_1]FF^H$$

and the precoding matrix F is updated using the updated canceling matrix C and the updated first and second Lagrange multipliers $\mu_1$, $\mu_2$ in accordance with $$F=\{[W(I+C-GW)^{-1}H_1]^H[H_2^H H_2+\mu_2 I]W(I+C-GW)^{-1}H_1+\mu_1 I]\}^{-1}\cdot[H_2W(I+C-GW)^{-1}H_1]^H,$$

where $H_1$ represents the forward channel matrix, $H_2$ represents the backward channel matrix, G represents the loop channel matrix, C represents the canceling matrix, F represents a precoding matrix proportional to an identity matrix, W represents a weighting matrix used for weighting in the main signal path, I represents the identity matrix, $\mu_1$, $\mu_2$ represent the first and second Lagrange multipliers, respectively, $P_0$ represents the average total transmit power for the transmitter, $P_r$ represents the predefined value for the total transmit power, and $\sigma_1^2$ represents thermal noise power.

10. The radio relay apparatus as claimed in claim 1, further comprising:
a feedforward compensation unit configured to weight the relay signal in the main signal path in accordance with a weighting matrix W to adjust the relay signal; and
a transmitting unit configured to transmit a precoding matrix F used for precoding in the transmitter to the transmitter,
wherein the weight optimization unit is configured to perform the iterative operations using the forward channel matrix $H_1$, the backward channel matrix $H_2$ and the loop channel matrix G to derive the canceling matrix C, the weighting matrix W and the precoding matrix F.

11. The radio relay apparatus as claimed in claim 10, wherein the weight optimization unit is configured to perform the iterative operations by iteratively updating the canceling matrix C, the weighting matrix W and the precoding matrix F to minimize the average error between the signal y transmitted from the transmitter and the signal x received at the receiver subject to constraints that average total transmit power from the transmitter be equal to a predefined value $P_0$ and that average total transmit power toward the receiver be equal to a predefined value $P_r$.

12. The radio relay apparatus as claimed in claim 11, wherein
the canceling matrix C is updated using a pre-update first Lagrange multiplier $\mu_1$, a pre-update second Lagrange multiplier $\mu_2$, the weighting matrix W and the precoding matrix F in accordance with $$C=\{[H_1FF^H H_1^H+\sigma_1^2 I][H_2^H F^H H_1^H]^{-1}[H_2^H H_2+\mu_2 I]+G\}W-I, \text{ and}$$

the second Lagrange multiplier $\mu_2$ is updated using the updated canceling matrix C, a pre-update weighting matrix W, a pre-update precoding matrix F and a pre-update first Lagrange multiplier $\mu_1$ in accordance with $$\mu_2 = tr\{U_2\}/P_r,$$
$$U_2 = H_2^H[I-H_2W(I+C-GW)^{-1}H_1F][W(I+C-GW)^{-1}H_1F]^H,$$
$$-\sigma_1^2 H_2^H H_2[W(I+C-GW)^{-1}][W(I+C-GW)^{-1}]^H$$

and the first Lagrange multiplier $\mu_1$ is updated using the updated canceling matrix C, the pre-update weighting matrix W, the pre-update precoding matrix F and the updated second Lagrange multiplier $\mu_2$ in accordance with $$\mu_1 = tr\{U_1\}/P_0,$$
$$U_1 = [W(I+C-GW)^{-1}H_1]^H H_2^H[I-H_2W(I+C-GW)^{-1}H_1F]F^H,$$
$$-\mu_2[W(I+C-GW)^{-1}H_1]^H[W(I+C-GW)^{-1}H_1]FF^H$$

and the precoding matrix F is updated using the updated canceling matrix C, the updated first and second Lagrange multipliers $\mu_1$, $\mu_2$ and the pre-update weighting matrix W in accordance with $$F=\{[W(I+C-GW)^{-1}H_1]^H[H_2^H H_2+\mu_2 I]W(I+C-GW)^{-1}H_1+\mu_1 I]\}^{-1}\cdot[H_2W(I+C-GW)^{-1}H_1]^H,$$

and the weighting matrix W is updated using the updated canceling matrix C, the updated precoding matrix F and the updated first and second Lagrange multipliers $\mu_1$, $\mu_2$ in accordance with $$W=\{[H_1FF^H H_1^H+\sigma_1^2 I][H_2^H F^H H_1^H]^{-1}[H_2^H H_2+\mu_2 I]+G\}^{-1}(I+C),$$

where $H_1$ represents the forward channel matrix, $H_2$ represents the backward channel matrix, G represents the loop channel matrix, C represents the canceling matrix, F represents a precoding matrix proportional to an identity matrix, W represents a weighting matrix used for weighting in the main signal path, I represents the identity matrix, $\mu_1$, $\mu_2$ represent the first and second Lagrange multipliers, respectively, $P_0$ represents the average total transmit power for the transmitter, $P_r$ represents the predefined value for the total transmit power, and $\sigma_1^2$ represents thermal noise power.

13. The radio relay apparatus as claimed in claim 1, further comprising:
a transmit power control unit configured to control transmit power for transmitting a relay signal to the receiver.

14. A radio relay method for receiving signals from a transmitter via multiple receive antennas and transmitting relay signals derived from the received signals to a receiver via multiple transmit antennas, the method comprising:
estimating a forward channel matrix $H_1$ and a loop channel matrix G, the forward channel matrix $H_1$ representing radio channel characteristics between the transmitter and the radio relay apparatus, the loop channel matrix G representing interference occurring in the relay signals due to concurrently transmitting and receiving signals at the radio relay apparatus;
deriving a canceling matrix C through iterative operations using the forward channel matrix $H_1$, the loop channel matrix G and a backward channel matrix $H_2$ representing radio channel characteristics between the radio relay apparatus and the receiver; and
subtracting a signal weighted in accordance with the canceling matrix C in a feedback path from a relay signal in a main signal path to adjust the relay signal.

* * * * *